US012739833B2

(12) United States Patent
He et al.

(10) Patent No.: US 12,739,833 B2
(45) Date of Patent: Sep. 15, 2026

(54) MEDIA ACCESS CONTROL PROCEDURES FOR BEAM INDEX INDICATIONS

(71) Applicant: QUALCOMM Incorporated, San Diego, CA (US)

(72) Inventors: Linhai He, San Diego, CA (US); Yan Zhou, San Diego, CA (US); Tao Luo, San Diego, CA (US); Ruiming Zheng, Beijing (CN); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/993,023

(22) Filed: Aug. 13, 2020

(65) Prior Publication Data

US 2021/0051651 A1 Feb. 18, 2021

Related U.S. Application Data

(60) Provisional application No. 62/887,631, filed on Aug. 15, 2019.

(51) Int. Cl.
*H04W 28/02* (2009.01)
*H04L 1/1829* (2023.01)
(Continued)

(52) U.S. Cl.
CPC ........... *H04W 72/21* (2023.01); *H04W 72/02* (2013.01); *H04W 72/044* (2013.01)

(58) Field of Classification Search
CPC ............. H04W 72/042; H04W 72/046; H04W 72/1268; H04W 16/28; H04W 72/04;
(Continued)

(56) References Cited

U.S. PATENT DOCUMENTS

2016/0057650 A1* 2/2016 Uchino ............. H04W 28/0278 370/235
2017/0207845 A1* 7/2017 Moon .................... H04B 7/088
(Continued)

FOREIGN PATENT DOCUMENTS

CN 109076365 A 12/2018
CN 109962756 A 7/2019
(Continued)

OTHER PUBLICATIONS

International Search Report and Written Opinion—PCT/US2020/046538—ISA/EPO—Oct. 30, 2020 (194080WO).
(Continued)

*Primary Examiner* — Marcus Smith
*Assistant Examiner* — Jason A Harley
(74) *Attorney, Agent, or Firm* — Holland & Hart LLP

(57) ABSTRACT

Methods, systems, and devices for wireless communications are described. A user equipment (UE) may select a beam from a set of beams and transmit an indication of the selected beam in a media access control (MAC) control element to establish a communication link with a base station. In some cases, the UE may select the beam and indicate the selection based on identifying a beam failure and/or determining to perform a random access procedure. When transmitting the indication of the selected beam, the UE may obtain an uplink resource for the transmission based on an availability of the uplink resource. For example, if the uplink resource is available, the UE may transmit the indication of the selected beam multiplexed with an uplink transmission. Alternatively, if the uplink resource is unavailable, the UE may request uplink resources for transmitting the indication of the selected beam.

30 Claims, 12 Drawing Sheets

(51) Int. Cl.

| | |
|---|---|
| ***H04W 36/36*** | (2009.01) |
| ***H04W 72/02*** | (2009.01) |
| ***H04W 72/04*** | (2023.01) |
| ***H04W 72/044*** | (2023.01) |
| ***H04W 72/1268*** | (2023.01) |
| ***H04W 72/21*** | (2023.01) |
| ***H04W 88/02*** | (2009.01) |

(58) Field of Classification Search

CPC ............... H04W 72/044; H04B 7/0695; H04B 7/15542; H04B 7/2606; H04B 7/0617; H04B 7/02; H04B 7/0413; H04B 7/0608; H04B 7/088; H04L 5/0094

USPC ........................................... 370/330; 455/450

See application file for complete search history.

(56) References Cited

U.S. PATENT DOCUMENTS

| | | | | |
|---|---|---|---|---|
| 2017/0302355 | A1 | 10/2017 | Islam et al. | |
| 2018/0131426 | A1* | 5/2018 | Lee | H04B 7/0456 |
| 2018/0167883 | A1* | 6/2018 | Guo | H04B 7/0617 |
| 2018/0192371 | A1* | 7/2018 | Jung | H04W 68/02 |
| 2018/0234959 | A1* | 8/2018 | Ahn | H04W 72/23 |
| 2018/0278467 | A1 | 9/2018 | John Wilson et al. | |
| 2018/0324723 | A1* | 11/2018 | Akkarakaran | H04W 56/001 |
| 2019/0082335 | A1 | 3/2019 | Yu et al. | |
| 2019/0082346 | A1* | 3/2019 | Tang | H04B 7/0617 |
| 2019/0141546 | A1* | 5/2019 | Zhou | H04B 7/0626 |
| 2019/0215870 | A1* | 7/2019 | Babaei | H04W 24/10 |
| 2019/0253941 | A1* | 8/2019 | Cirik | H04W 36/0077 |
| 2019/0306850 | A1* | 10/2019 | Zhang | H04W 72/046 |
| 2019/0306875 | A1* | 10/2019 | Zhou | H04B 7/0617 |
| 2019/0350028 | A1* | 11/2019 | Kaasalainen | H04W 74/004 |
| 2020/0267048 | A1* | 8/2020 | Yu | H04L 1/1896 |
| 2020/0350972 | A1* | 11/2020 | Yi | H04B 7/088 |
| 2020/0351066 | A1* | 11/2020 | Cirik | H04L 5/0098 |
| 2021/0050901 | A1* | 2/2021 | Chin | H04B 7/0695 |
| 2021/0234601 | A1* | 7/2021 | Awadin | H04W 74/0808 |
| 2021/0329596 | A1* | 10/2021 | Freda | H04W 72/02 |
| 2021/0345314 | A1* | 11/2021 | Li | H04W 72/046 |
| 2022/0061087 | A1* | 2/2022 | Koskela | H04W 72/1268 |
| 2022/0103227 | A1* | 3/2022 | Lee | H04W 72/23 |
| 2022/0141848 | A1* | 5/2022 | Wong | H04W 72/566<br>370/329 |

FOREIGN PATENT DOCUMENTS

| | | | | |
|---|---|---|---|---|
| CN | 110034799 A | | 7/2019 | |
| CN | 110226340 A | | 9/2019 | |
| EP | 3525516 A1 | * | 8/2019 | H04B 7/0695 |
| WO | WO2017024516 A1 | | 2/2017 | |
| WO | WO-2018129300 A1 | | 7/2018 | |
| WO | WO2019020046 A1 | | 1/2019 | |
| WO | WO-2019119399 A1 | | 6/2019 | |

OTHER PUBLICATIONS

Huawei, et al., "Beam Failure Recovery for SCell with New Beam Information," 3GPP TSG RAN WG1 Meeting #97, R1-1907533, May 17, 2019 (May 17, 2019), section 2, 7 pages.

Intel Corporation: "On Beam Management Enhancement," 3GPP TSG RAN WG1 Meeting #97, R1-1906816, May 17, 2019 (May 17, 2019), sections 1-4, 16 pages.

International Search Report and Written Opinion—PCT/CN2019/102367—ISA/EPO—Apr. 26, 2020.

Qualcomm Incorporated: "Enhancements on Multi-beam Operation," 3GPP TSG-RAN WG1 Meeting #97, R1-1907290, May 17, 2019 (May 17, 2019), sections 2-8, 26 pages.

Taiwan Search Report—TW109127742—TIPO—Sep. 26, 2023 (194080TW).

Convida Wireless: "On Beam Failure Recovery for SCell", 3GPP TSG-RAN WG1 #97, R1-1907466, Reno, USA, May 13, 2019-May 17, 2019, May 4, 2019, pp. 1-9.

European Search Report—EP24200704—Search Authority—The Hague—Nov. 11, 2024 (194080EPD1).

Intel Corporation: "On Beam Management Enhancement", 3GPP TSG RAN WG1 Meeting #97, R1-1906816, Reno, USA, May 13-17, 2019, pp. 1-16.

Qualcomm Incorporated: "Enhancements on Multi-Beam Operation", 3GPP TSG-RAN WG1 Meeting #97, R1-1907290, Reno, USA, May 13-17, 2019, pp. 1-27.

3GPP: "3rd Generation Partnership Project, Technical Specification Group Radio Access Network, NR, Medium Access Control (MAC) Protocol Specification (Release 15)", 3GPP TS 38.321 V15.6.0, Technical Specification, Jun. 27, 2019, pp. 1-76.

Intel Corporation: "Summary on SCell BFR and L1-SINR Based Beam Selection", 3GPP TSG RAN WG1 Ad-Hoc Meeting 1901, R1-1901443, Taipei, Jan. 21 25, 2019, 21 Pages, Jan. 1, 2019, Jan. 24, 2019.

* cited by examiner

MEDIA ACCESS CONTROL PROCEDURES FOR BEAM INDEX INDICATIONS

CROSS REFERENCE

The present Application for Patent claims the benefit of U.S. Provisional Patent Application No. 62/887,631 by HE et al., entitled "MEDIA ACCESS CONTROL PROCEDURES FOR BEAM INDEX INDICATIONS," filed Aug. 15, 2019, and to PCT International Application No. PCT/CN2019/102367 by HE et al., entitled "SCHEDULING REQUEST FOR CELL-SPECIFIC RESOURCES," filed Aug. 23, 2019, which are assigned to the assignee hereof, and expressly incorporated by reference herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some cases, a UE and a base station may communicate via beamforming techniques, where each wireless device uses directional beams to transmit or receive signals from other wireless devices. For example, the UE and the base station may both use a set of antennas to transmit or receive signals in a particular direction rather than transmitting the signal in many directions (e.g., omni-directionally), resulting in a stronger signal transmitted in that particular direction. However, the UE and the base station may form multiple beams at once to increase chances that a signal is successfully transmitted and received. Accordingly, techniques are desired for indicating a preferred beam (e.g., a stronger beam) for subsequent communications.

SUMMARY

The described techniques relate to improved methods, systems, devices, and apparatuses that support media access control (MAC) procedures for beam index indications. Generally, the described techniques provide for a user equipment (UE) to select a first beam (e.g., a preferred beam) from a set of beams and to transmit an indication of the selected first beam to a base station in a MAC control element (CE) to establish a communication link with the base station. In some cases, the UE may select the first beam and indicate the selection based on identifying a beam failure on at least one cell with the base station, determining to establish the communication link via a random access channel (RACH) procedure (e.g., a two-step RACH, a four-step RACH, etc.), or a combination thereof. When transmitting the indication of the selected beam, the UE may obtain an uplink resource for the transmission based on an availability of the uplink resource compared to a threshold value (e.g., whether the uplink resource is scheduled within N slots in the future). For example, if the uplink resource is available, the UE may transmit the indication of the selected first beam multiplexed with the MAC CE. Alternatively, if the uplink resource is unavailable, the UE may request uplink resources (e.g., via configured uplink resources, via a scheduling request, etc.) for transmitting the indication of the selected first beam.

A method of wireless communications at a UE is described. The method may include determining to establish a communication link between the UE and a serving cell of a base station, selecting, by the UE to establish the communication link, a first beam of a set of candidate beams of the serving cell, and transmitting, to the base station, an indication of the selected first beam in a MAC CE on an uplink resource based on a comparison of a timing of an availability of the uplink resource to a threshold value.

An apparatus for wireless communications at a UE is described. The apparatus may include a processor, memory coupled with the processor, and instructions stored in the memory. The instructions may be executable by the processor to cause the apparatus to determine to establish a communication link between the UE and a serving cell of a base station, select, by the UE to establish the communication link, a first beam of a set of candidate beams of the serving cell, and transmit, to the base station, an indication of the selected first beam in a MAC CE on an uplink resource based on a comparison of a timing of an availability of the uplink resource to a threshold value.

Another apparatus for wireless communications at a UE is described. The apparatus may include means for determining to establish a communication link between the UE and a serving cell of a base station, selecting, by the UE to establish the communication link, a first beam of a set of candidate beams of the serving cell, and transmitting, to the base station, an indication of the selected first beam in a MAC CE on an uplink resource based on a comparison of a timing of an availability of the uplink resource to a threshold value.

A non-transitory computer-readable medium storing code for wireless communications at a UE is described. The code may include instructions executable by a processor to determine to establish a communication link between the UE and a serving cell of a base station, select, by the UE to establish the communication link, a first beam of a set of candidate beams of the serving cell, and transmit, to the base station, an indication of the selected first beam in a MAC CE on an uplink resource based on a comparison of a timing of an availability of the uplink resource to a threshold value.

Some examples of the method, apparatuses, and non-transitory computer-readable medium described herein may further include operations, features, means, or instructions for initiating a request for uplink resources for transmitting, to the base station, an indication of the selected first beam.

Some examples of the method, apparatuses, and non-transitory computer-readable medium described herein may further include operations, features, means, or instructions for transmitting the request on uplink control resources that indicate, to the base station, a beam of the serving cell that has failed, and receiving, from the base station in response to the transmitted request, an indication of uplink resources in a second serving cell for the UE to use to transmit the indication of the selected first beam.

In some examples of the method, apparatuses, and non-transitory computer-readable medium described herein, the request may include operations, features, means, or instructions for transmitting the request on dedicated uplink control resources configured to indicate, to the base station, a beam or a set of beams configured for the first serving cell that may have failed, and receiving, from a second serving cell of the base station in response to the transmitted request, downlink control information indicating uplink resources of the second serving cell for the UE to use to transmit the indication of the selected first beam.

Some examples of the method, apparatuses, and non-transitory computer-readable medium described herein may further include operations, features, means, or instructions for transmitting the request on uplink control resources of a transmission occasion, the uplink control resources indicating, to the base station, that a beam of the serving cell may have failed, and the transmission occasion of the uplink control resources associated with a set of serving cells to indicate the serving cell on which the beam may have failed, and receiving, from the base station in response to the transmitted request, an indication of uplink resources in a second serving cell different than the serving cell for the UE to use to transmit the indication of the selected first beam.

In some examples of the method, apparatuses, and non-transitory computer-readable medium described herein, the request includes a random access message of a random access procedure to establish the communication link between the UE and the serving cell of the base station.

In some examples of the method, apparatuses, and non-transitory computer-readable medium described herein, determining to establish the communication link may include operations, features, means, or instructions for communicating with the base station via the communication link, identifying a beam failure for the communication link between the UE the serving cell, and determining to establish the communication link between the UE and the serving cell based on the identified beam failure.

In some examples of the method, apparatuses, and non-transitory computer-readable medium described herein, transmitting the indication of the selected first beam in the MAC CE based on the comparison may include operations, features, means, or instructions for obtaining the uplink resource for the UE to transmit an indication of the first beam, comparing a threshold number of slots to a number of slots between a current time and the uplink resource, where the threshold value includes the threshold number of slots, determine the availability of the uplink resource based on the number of slots between the current time and the uplink resource being less than the threshold number of slots, and transmitting, based on the determined availability indicating that the number of slots between the current time and the uplink resource may be less than the threshold number of slots, the indication of the selected first beam in the MAC CE.

In some examples of the method, apparatuses, and non-transitory computer-readable medium described herein, transmitting the indication of the selected first beam in the MAC CE based on the comparison may include operations, features, means, or instructions for obtaining the uplink resource for the UE to transmit an indication of the first beam, comparing a threshold number of slots to a number of slots between a current time and the uplink resource, where the threshold value includes the threshold number of slots, determine the availability of the uplink resource based on the number of slots between the current time and the uplink resource being less than the threshold number of slots, transmitting a request for uplink resources to the base station based on the determined availability indicating that the number of slots between the current time and the uplink resource may be greater than the threshold number of slots, receiving an indication of the uplink resources in response to the transmitted request, and transmitting, on the indicated uplink resources, the indication of the selected first beam in the MAC CE.

Some examples of the method, apparatuses, and non-transitory computer-readable medium described herein may further include operations, features, means, or instructions for receiving a configuration for beam failure recovery, the request for the uplink resources transmitted based on the received configuration.

In some examples of the method, apparatuses, and non-transitory computer-readable medium described herein, transmitting the request for the uplink resources to the base station may include operations, features, means, or instructions for transmitting a scheduling request sequence indicating the request to the base station.

In some examples of the method, apparatuses, and non-transitory computer-readable medium described herein, the scheduling request sequence may be transmitted on the uplink resources corresponding to a highest priority logical channel configured for the UE.

In some examples of the method, apparatuses, and non-transitory computer-readable medium described herein, transmitting the indication of the selected first beam may include operations, features, means, or instructions for transmitting, to the base station, the MAC CE in a RACH message of a RACH procedure.

Some examples of the method, apparatuses, and non-transitory computer-readable medium described herein may further include operations, features, means, or instructions for determining that a second beam of the set of candidate beams may be available to transmit the indication of the first beam prior to the availability of the uplink resource by at least the threshold value, where the uplink resource includes the first beam, and the indication of the selected first beam may be transmitted in a MAC CE on the second beam based on the determination that the second beam may be available.

In some examples of the method, apparatuses, and non-transitory computer-readable medium described herein, the indication of the selected first beam may be transmitted on the second beam in a first message of a two-step RACH procedure.

In some examples of the method, apparatuses, and non-transitory computer-readable medium described herein, the indication of the selected first beam may be transmitted on the second beam in a connection request message of a four-step RACH procedure.

Some examples of the method, apparatuses, and non-transitory computer-readable medium described herein may further include operations, features, means, or instructions for performing a logical channel prioritization procedure for a MAC protocol data unit (PDU) including the MAC CE, where the logical channel prioritization procedure provides a priority for the MAC CE greater than each other MAC CE of the MAC PDU, greater than data of the MAC PDU, and less than information of a common control channel (CCCH) message of the MAC PDU.

Some examples of the method, apparatuses, and non-transitory computer-readable medium described herein may further include operations, features, means, or instructions for initiating a timer and a counter based on determining to establish the communication link, incrementing the counter based on transmitting the indication of the selected first beam, and retransmitting the indication of the selected first beam in the MAC CE based on the timer expiring before a message may be received on the selected first beam and the counter being below a counter threshold.

DETAILED DESCRIPTION

Figure 1:
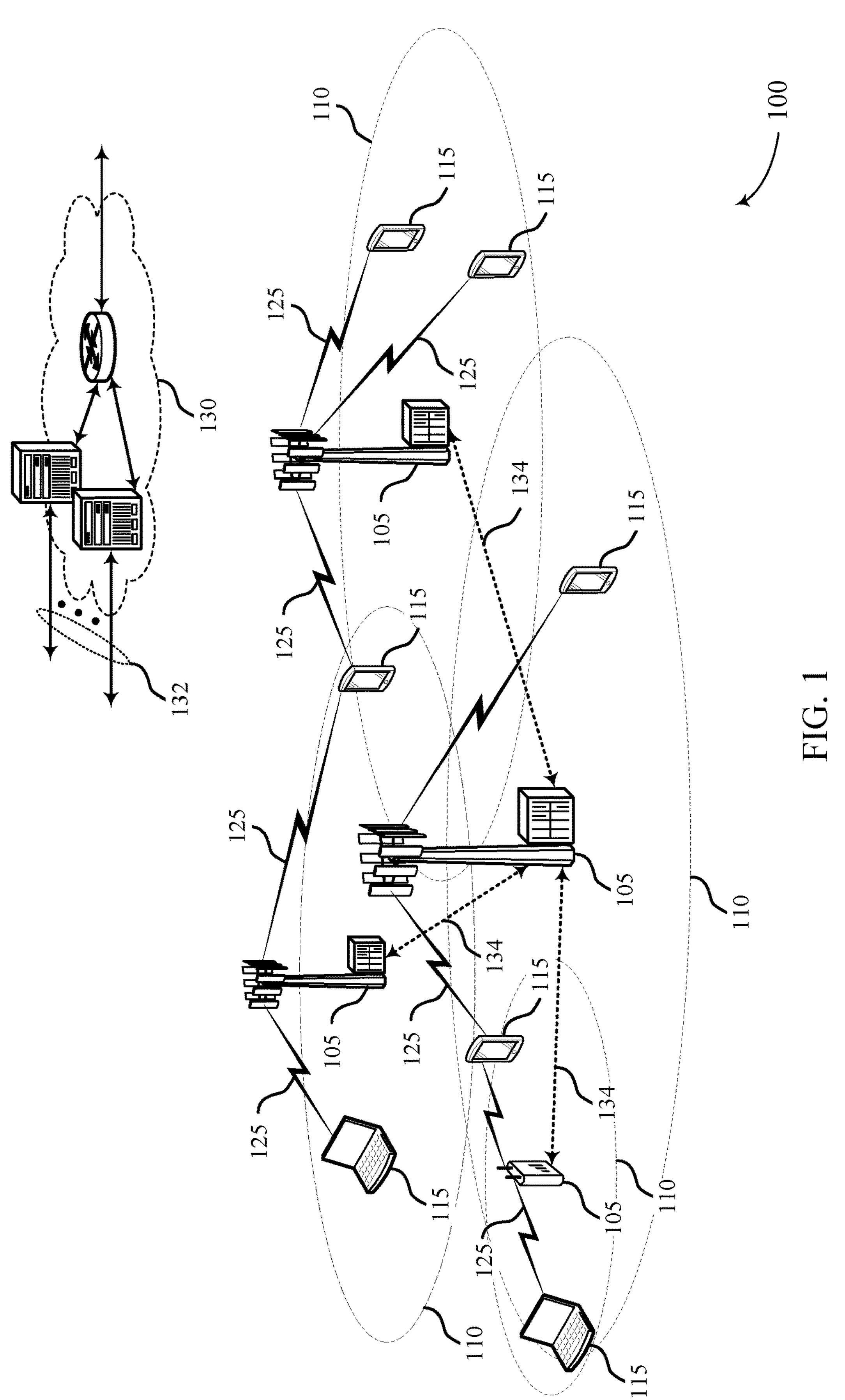
FIG. 1 illustrates an example of a system for wireless communications that supports media access control (MAC) procedures for beam index indications in accordance with aspects of the present disclosure.

To overcome high path losses associated with high carrier frequencies, a base station and a user equipment (UE) may utilize beamforming techniques for uplink and downlink communications. In some cases, when determining to establish a communications link with a base station, a UE may identify a preferred beam (e.g., a first beam from a set of beams) to be used for establishing the communications link and/or any subsequent communications. For example, the preferred beam may provide a strongest signal quality from the base station from a set of possible beams the base station can use for transmitting downlink signals to the UE. Subsequently, the UE may transmit an indication of this preferred beam to the base station on a media access control (MAC) control element (CE). Accordingly, the base station may then transmit a subsequent downlink message to the UE using the preferred beam.

In some cases, the UE may determine to establish the communications link based on identifying a previously occurring beam failure on at least one cell with the base station (e.g., a secondary cell (SCell)), where the preferred beam is used for a beam failure recovery procedure. Additionally or alternatively, the UE may determine to establish an initial connection with the base station or reestablish communications on another cell with the base station (e.g., a primary cell (PCell), a primary SCell (PSCell), a secondary PCell (SPCell), etc.), and the preferred beam may be used for a random access channel (RACH) procedure. When performing the RACH procedure, the UE may transmit the indication of the preferred beam to the base station in one of the messages for the RACH procedure (e.g., a first message in a two-step RACH procedure, a connection request/third message in a four-step RACH procedure, etc.).

Additionally, the UE may transmit the indication of the preferred beam to the base station based on an availability of an uplink resource compared with a threshold value. For example, if the uplink resource is scheduled and available within N slots (e.g., or an N number of different length transmission time interval (TTI)), where N is a positive integer, after the UE determines to establish the communications link and identifies the preferred beam, the UE may multiplex the indication with a MAC protocol data unit (PDU) transmitted on the uplink resource. Alternatively, if the uplink resource is unavailable, the UE may request additional uplink resources (e.g., based on configured uplink channel resources, via a scheduling request, etc.) to transmit the indication of the preferred beam.

Aspects of the disclosure are initially described in the context of a wireless communications system. Additionally, aspects of the disclosure are illustrated through an additional wireless communications system and process flow examples. Aspects of the disclosure are further illustrated by and described with reference to apparatus diagrams, system diagrams, and flowcharts that relate to MAC procedures for beam index indications.

FIG. 1 illustrates an example of a wireless communications system 100 that supports MAC procedures for beam index indications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.)

and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different synchronization signal (SS) blocks on respective directional beams, where one or more SS blocks may be included within an SS burst.

After receiving the PSS and SSS, the UE 115 may receive a master information block (MIB), which may be transmitted in the PBCH. The MIB may contain system bandwidth information, an SFN, and a physical HARQ indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain RRC configuration information related to RACH procedures, paging, PUCCH, PUSCH, power control, SRS, and cell barring.

After completing initial cell synchronization, a UE 115 may decode the MIB, SIB1 and SIB2 prior to accessing the network. The MIB may be transmitted on PBCH and may utilize the first 4 OFDMA symbols of the second slot of the first subframe of each radio frame. It may use the middle 6 RBs (72 subcarriers) in the frequency domain. The MIB carries a few important pieces of information for UE initial access, including downlink channel bandwidth in term of RBs, PHICH configuration (duration and resource assignment), and SFN. A new MIB may be broadcast every fourth radio frame (SFN mod 4=0) at and rebroadcast every frame (10 ms). Each repetition is scrambled with a different scrambling code.

After reading a MIB (either a new version or a copy), the UE 115 may can try different phases of a scrambling code until it gets a successful CRC check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase. After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be set to 8, 16, 32, 64, 128, 256 or 512 radio frames.

After the UE 115 decodes SIB2, it may transmit a RACH preamble (e.g., a message 1 (Msg1) in a four-step RACH procedure) to a base station 105. For example, the RACH preamble may be randomly selected from a set of 64 predetermined sequences. This random selection may enable the base station 105 to distinguish between multiple UEs 115 trying to access the system simultaneously. The base station 105 may respond with a random access response (e.g., a second message (Msg2)) that provides an uplink resource grant, a timing advance, and a temporary cell radio network temporary identifier (C-RNTI). The UE 115 may then transmit an RRC connection request (e.g., a third message (Msg3)) along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message (e.g., a fourth message (Msg4)) addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) it may repeat the RACH procedure by transmitting a new RACH preamble. Such exchange of messages between the UE 115 and base station 105 for random access may be referred to as a four-step RACH procedure.

In other examples, a two-step RACH procedure may be performed for random access. For instance, wireless devices operating in licensed or unlicensed spectrum within wireless communications system 100 may initiate a two-step RACH procedure to reduce delay in establishing communication with a base station 105 (e.g., as compared to a four-step RACH procedure). In some cases, the two-step RACH procedure may operate regardless of whether a wireless device (e.g., a UE 115) has a valid timing advance (TA). For example, a UE 115 may use a valid TA to coordinate the timing of its transmissions to a base station 105 (e.g., to account for propagation delay) and may receive the valid TA as part of the two-step RACH procedure. Additionally, the two-step RACH procedure may be applicable to any cell size, may work regardless of whether the RACH procedure is contention-based or contention-free, and may combine multiple RACH messages from a four-step RACH procedure. For example, the two-step RACH procedure may include a first message (e.g., a message A (MsgA)) that combines the Msg1 and Msg3 of the four-step RACH procedure and a second message (e.g., a message B (MsgB)) that combines the Msg2 and Msg4 of the four-step RACH procedure.

The two-step RACH procedure may be applicable to any cell size supported in a wireless communications system, be able to operate regardless of whether a UE 115 has a valid timing advance (TA), and may be applied to any RRC state of the UE 115 (e.g., an idle state (RRC_IDLE), an inactive state (RRC_INACTIVE), a connected state (RRC_CONNECTED), etc.). In some cases, the two-step RACH procedure may result in a reduction in signaling overhead and latency, an enhanced RACH capacity, power savings for the UE 115, and provide synergy with other applications (e.g., positioning, mobility enhancement, etc.).

In some cases, a UE 115 may be provided, for a base station 105 (e.g., serving cell), with a first set of periodic channel state information (CSI) reference signal (CSI-RS) resource configuration indexes (q0) by a first higher layer parameter (e.g., failureDetectionResources) and with a second set of periodic CSI-RS resource configuration indexes and/or SS/PBCH block indexes (q1) by a second higher layer parameter (e.g., candidateBeamRSList) for radio link quality measurements on the base station 105. Additionally or alternatively, if the UE 115 is not provided with the first higher layer parameter, the UE 115 may determine the set q0 to include SS/PBCH block indexes and periodic CSI-RS resource configuration indexes with same values as the reference signal indexes in the reference signal sets indicated by transmission configuration indicator (TCI) states for respective control resource sets (CORESETs) that the UE 115 uses for monitoring a downlink channel (e.g., physical downlink control channel (PDCCH)). The UE 115 may expect the set q0 to include up to two reference signal indexes and, if there are two RS indexes, the set q0 includes reference signal indexes with quasi co-location (QCL)-TypeD configuration for the corresponding TCI states. Additionally, the UE 115 may expect single port reference signals in the set q0.

Based on the set q0, the UE 115 may monitor a set of reference signals within the set q0 for a beam failure detection as part of a beam failure recovery procedure to improve the robustness of communications with the base station 105. For the beam failure recovery procedure, the UE 115 may detect a beam failure, identify a new candidate beam, transmit a beam failure recovery request to the base station 105, and monitor for a response to the beam failure recovery response from the base station 105. Accordingly, as part of detecting the beam failure, the UE 115 may monitor up to a maximum set of reference signals belonging to the set q0. In some cases, the maximum number of sets of reference signals may be two (2), though greater numbers of sets of references signals may be used. As noted above, the UE 115 may determine the set q0 from reference signals used for monitoring active CORESETs (e.g., reference signal sets indicated by TCI states for respective CORESETs that the UE 115 uses for monitoring a PDCCH). In some cases, the UE 115 may perform a RACH procedure (e.g., contention based random access (CBRA), four-step RACH, two-step RACH, etc.) as part of the beam failure recovery procedure to reestablish a connection with the base station 105.

In some wireless communications, a base station 105 (e.g., network) may configure a MAC CE for a UE 115 to report a new preferred beam after beam failure is triggered on an SCell. For example, this new MAC CE may include an index of the SCell on which the beam failure was triggered and an index of the new preferred beam for the SCell. In some cases, this new MAC CE may be referred to as a beam index indication MAC CE. However, conventionally, the UE may not know which uplink resources to use for transmitting the beam index indication and/or may be underutilizing the beam index indication for a subset of procedures.

Wireless communications system 100 may support efficient techniques for transmitting a beam index indication of a new preferred beam on an uplink resource based on the availability of the uplink resource and for transmitting the beam index indication for different communication establishment scenarios. For example, if the uplink resource is scheduled and available within N slots after a UE 115 determines to establish the communications link and identifies the new preferred beam, the UE 115 may multiplex the beam index indication with a MAC PDU transmitted on the uplink resource. Alternatively, if the uplink resource is unavailable, the UE 115 may request additional uplink resources (e.g., based on configured uplink channel resources, via a scheduling request, etc.) to transmit the beam index indication. Additionally, the UE 115 may transmit the beam index indication for a beam failure recovery procedure as described above, as well as for a RACH procedure to establish communications with at least one cell of a base station 105. Accordingly, the UE 115 may transmit the beam index indication in a message of the RACH procedure (e.g., a first message in a two-step RACH procedure, a connection request/third message in a four-step RACH procedure).

Figure 2:
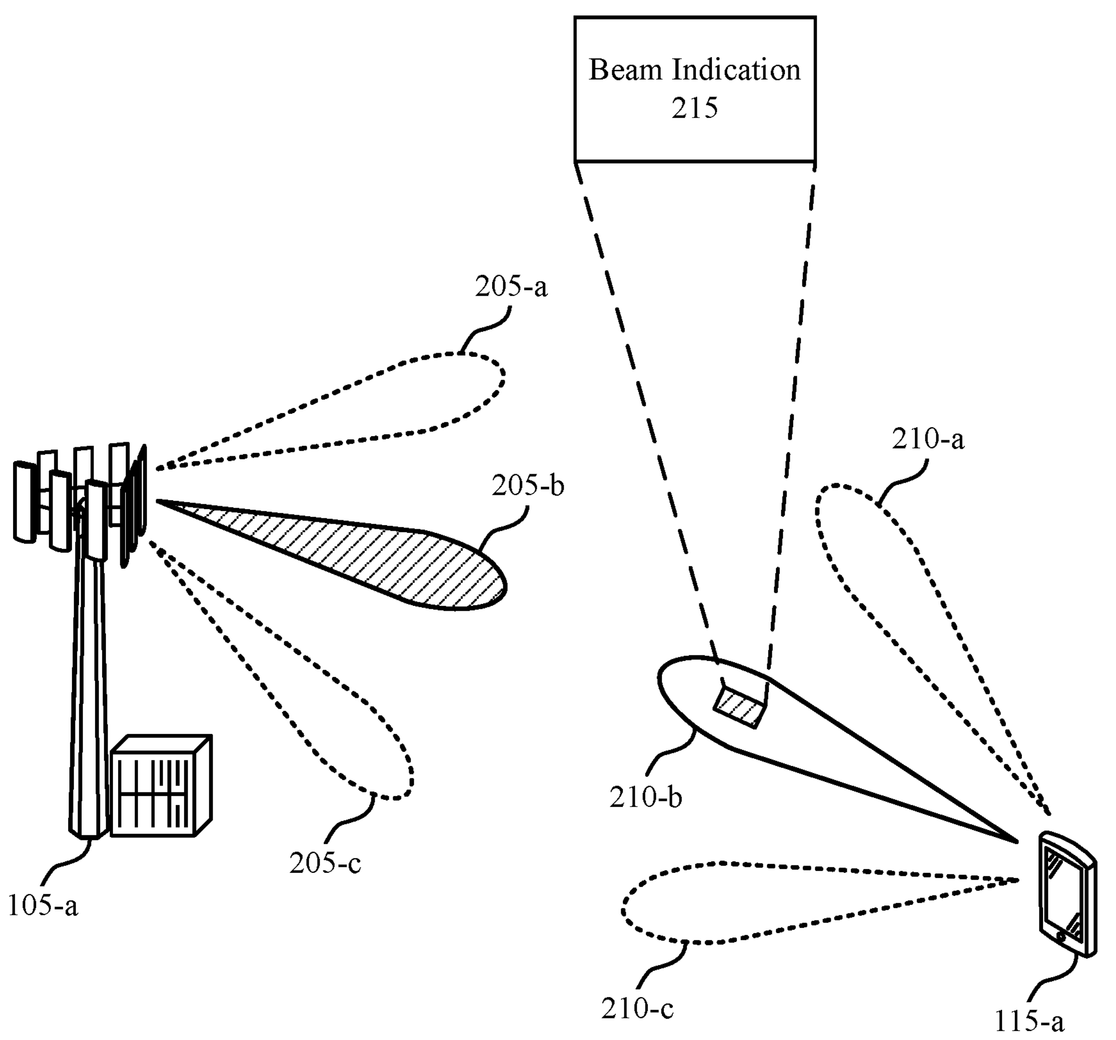
FIG. 2 illustrates an example of a wireless communications system that supports MAC procedures for beam index indications in accordance with aspects of the present disclosure.

FIG. 2 illustrates an example of a wireless communications system 200 that supports MAC procedures for beam index indications in accordance with aspects of the present disclosure. In some examples, wireless communications system 200 may implement aspects of wireless communications system 100. Wireless communications system 200 may include a base station 105-*a* and a UE 115-*a*, which may be examples of a corresponding base station 105 and UE 115, respectively, as described above with reference to FIG. 1. As described herein, base station 105-*a* and UE 115-*a* may use beamforming techniques to communicate with each other. For example, base station 105-*a* may use one or more beams 205 for transmitting downlink signals to UE 115-*a* and/or receiving uplink signals from UE 115-*a*. Additionally, UE 115-*a* may use one or more beams 210 for transmitting uplink signals to base station 105-*a* and/or receiving downlink signals from base station 105-*a*. In some cases, UE 115-*a* may communicate with base station 105-*a* via one or more cells on base station 105-*a* (e.g., PCell, SCell, PSCell, SPCell, etc.).

In some cases, UE 115-*a* may identify a beam failure that is triggered on a cell of base station 105-*a* (e.g., SCell). Subsequently, UE 115-*a* may measure a link quality of one or more candidate beams configured for that cell where the beam failure was detected. For example, UE 115-*a* may measure respective link qualities of beams 205-*a*, 205-*b*, and 205-*c* transmitted by base station 105-*a* (e.g., by measuring reference signals on each beam 205). In some cases, UE 115-*a* may perform the link quality measurements if the measurements are not readily available (e.g., if UE 115-*a* has not measured the link qualities recently or at all).

Accordingly, a beam indication 215 (e.g., beam index indication) may be triggered once the measurements are available. That is, UE 115-*a* may select a beam 205 transmitted by base station 105-*a* that is preferred for subsequent downlink transmissions (e.g., beam failure recovery procedure) based on the link quality measurements. For example, UE 115-*a* may select beam 205-*b* (e.g., preferred beam) for base station 105-*a* to perform a beam failure recovery procedure based on beam 205-*b* having a best signal quality (e.g., strongest received signal, least amount of interference, etc.) compared with beams 205-*a* and 205-*c*. After beam indication 215 (e.g., indicating beam 205-*b*) is triggered, a MAC CE for carrying beam indication 215 (e.g., beam index indication MAC CE) may be generated when uplink resources become available to send the MAC CE carrying beam indication 215 to base station 105-*a* (e.g., the network).

Accordingly, if there is an upcoming uplink resource scheduled within N number of slots (e.g., or another length TTI) in the future, UE 115-*a* may multiplex the MAC CE carrying beam indication 215 in a MAC PDU that will be transmitted over this uplink resource. In some cases, N may either be configured by base station 105-*a* (e.g., via RRC signaling) or defined (e.g., predefined for base station 105-*a* and UE 115-*a*). Additionally, the uplink resource may either be a dynamic grant or a configured grant. Subsequently, UE 115-*a* may then transmit beam indication 215 to base station 105-*a* on the uplink resource (e.g., based on multiplexing the MAC CE carrying beam indication 215 in the MAC PDU).

Additionally or alternatively, if there is no uplink resource readily available or the uplink resources occur too late to signal the MAC CE carrying beam indication 215 (e.g., low latency may be needed for recovering failed beams and performing the beam failure recovery procedure), UE 115-*a* may request uplink resources over an uplink channel (e.g., physical uplink control channel (PUCCH)). For example, base station 105-*a* may configure an uplink channel resource dedicated to the beam failure recovery procedure. Accordingly, when beam indication 215 is triggered, UE 115-*a* may use at least one valid occasion of this dedicated uplink channel resource to instruct (e.g., request) base station 105-*a* to signal new uplink resources on the physical layer (e.g., to use the new uplink resources for transmitting the MAC CE carrying beam indication 215). This signal (e.g., of the new uplink resources) may be a known sequence of symbols (e.g., or different length TTIs) configured for UE 115-*a*.

Additionally or alternatively, rather than using the dedicated uplink channel, UE 115-*a* may send a scheduling request sequence (e.g., initiate a scheduling request) over uplink channel resources (e.g., PUCCH resources) configured for scheduling requests to request uplink resources for transmitting, to base station 105-*a*, an indication of the selected first beam. In some cases, a scheduling request may be used for UE 115-*a* to signal a new data arrival, and base station 105-*a* may then provide uplink resources for the new data. Additionally, base station 105-*a* may configure different sets of uplink channel resources for different data logical channels based on configured priorities of the data logical channels. Accordingly, to enable prompt recovery of failed beams (e.g., faster beam failure recovery procedures), the scheduling request for the MAC CE carrying beam indication 215 may be sent over the uplink channel resources assigned to a data logical channel with a highest priority configured for UE 115-*a*. In some cases, UE 115-*a* may request the uplink resources for transmitting beam indication 215 based on performing a RACH procedure. For example, after experiencing the beam failure on a cell (e.g., serving cell, SCell, PCell, SPCell, PSCell, etc.), UE 115-*a* may perform a RACH procedure to reconnect to the cell. As part of the RACH procedure or once the RACH procedure is complete, UE 115-*a* may request uplink resources from the cell, where the uplink resources can be used to transmit beam indication 215.

When transmitting the scheduling request to request uplink resources for transmitting beam indication 215 (e.g., of the selected first beam), UE 115-*a* may transmit a one-bit indication to base station 105-*a* (e.g., the network) to indicate that an uplink resource is requested. Additionally, base station 105-*a* may configure multiple scheduling request configurations for UE 115-*a* to transmit the scheduling request, such that UE 115-*a* can transmit the scheduling request over uplink resources (e.g., PUCCH resources) in different scheduling request configurations. For example, UE 115-*a* may use one of the different scheduling request configurations based on a priority of data that triggered the scheduling request, where a mapping of different priorities of data to the different scheduling request configurations (e.g., indications of which scheduling request configuration can be used for each priority of data) is configured by base station 105-*a*. However, UE 115-*a* may be unable to indicate from which serving cells (e.g., one or more SCells) that UE 115-*a* wants uplink resources for transmitting beam indication 215 (e.g., which serving cells have beams that can support beam indication 215). For example, since base station 105-*a* does not know this scheduling request is for a beam failure recovery procedure (e.g., if no dedicated PUCCH resources are allocated for this purpose) or on which serving cell the beam failure has occurred, base station 105-*a* may send a downlink message (e.g., downlink control information (DCI)) to grant the requested uplink resources on a failed downlink (e.g., PDCCH) beam. Accordingly, UE 115-*a* may not be able to receive the grant indicating the uplink resources to send the beam failure indication MAC CE (e.g., MAC CE carrying beam indication 215).

In some cases, to enable UE 115-*a* to receive an indication (e.g., a grant) of the uplink resources to be used for transmitting the MAC CE carrying beam indication 215, base station 105-*a* (e.g., the network) may configure a dedicated PUCCH scheduling request configuration for beam failure recovery. Accordingly, when UE 115-*a* requests uplink resource for transmitting the MAC CE carrying beam indication 215 (e.g., a beam failure recovery MAC CE), UE 115-*a* may transmit the scheduling request over one or more PUCCH resources (e.g., uplink resources) according to this dedicated PUCCH scheduling request configuration. For example, the dedicated PUCCH scheduling request configuration may include an indication of which PUCCH resources (e.g., time and/or frequency resources in a PUCCH) to transmit the scheduling request.

Subsequently, when base station 105-*a* receives this scheduling request (e.g., transmitted according to the dedicated PUCCH scheduling request configuration), base station 105-*a* may identify that the scheduling request is triggered by the beam failure recovery procedure. Base station 105-*a* may then send the downlink message (e.g., DCI) to grant the requested uplink resource(s) for transmitting the MAC CE carrying beam indication 215 over a downlink channel (e.g., PDCCH) in a special cell (SpCell) configured for UE 115-*a*, where the requested uplink resource(s) are also located in the SpCell. In some cases, the SpCell may include a PCell, a PSCell, or an additional cell configured for primary communications for UE 115-*a*. By transmitting the indication of the uplink resources (e.g., a grant for the uplink resources) on the SpCell, UE 115-*a* has a higher chance of receiving the indication of the uplink resources based on an unlikeliness that downlink (e.g., PDCCH) beams in both an SpCell and an SCell failing at the same time for UE 115-*a*. However, if the downlink beam in the SpCell fails, UE 115-*a* may trigger a RACH based recovery procedure to reestablish communications with the SpCell and may transmit the request for the uplink resources to transmit the MAC CE to carry beam indication 215 during the corresponding RACH procedure and then transmit the MAC CE once the RACH procedure is completed.

Additionally or alternatively, a dedicated scheduling request configuration may not be used for a beam failure recovery procedure. Rather, UE 115-*a* may use scheduling request configurations that are configured for conventional scheduling requests (e.g., triggered by new data as described above) but use the scheduling request configurations for the purpose of the beam failure recovery procedure. For example, each uplink control resource (e.g., PUCCH resource(s) used for transmitting the scheduling request) in a scheduling request configuration may be associated with a different one or more serving cells, where the mapping between serving cell to uplink control resource is either one-to-one or multiple-to-one.

For example, for a one-to-one mapping, an uplink control resource in a first transmission occasion (e.g., a first slot, which may be slot 0) may be associated with a first serving cell (e.g., serving cell 0), an uplink control resource in a second slot (e.g., a slot 1) may be associated with a second serving cell (e.g., serving cell 1), etc. In some cases, an uplink control resource in a slot may be associated with multiple serving cells (e.g., the second slot may be associated with the second serving cell, a third serving cell, and a fourth serving cell). Additionally or alternatively, for a multiple-to-one mapping, an uplink control resource in the first slot (e.g., slot 0) may be associated with any serving cell except the first serving cell, an uplink control resource in the second slot may be associated with any serving cell except the second serving cell, etc. That is, for the multiple-to-one mapping, UE 115-*a* may indicate a set of serving cells (e.g., excluding the serving cell corresponding to the slot number) on which the requested uplink resources for transmitting the MAC CE carrying beam indication 215 can be allocated.

Accordingly, when a beam failure recovery is triggered on an SCell (e.g., secondary serving cell), the MAC layer may trigger a scheduling request and send the scheduling request to the physical layer. Together with this scheduling request, the MAC layer may indicate which SCell(s) to avoid for receiving an indication of the requested uplink resources (e.g., an uplink grant for the uplink resources) and, subsequently, for transmitting the MAC CE carrying beam indication 215. In some cases, downlink beams (e.g., PDCCH beams) on multiple SCells may have a same QCL relationship (e.g., signals from the QCL SCells experience similar channel conditions and go through a similar channel such that UE 115-*a* can assume the signals come from a same location), and, based on the QCL relationship, UE 115-*a* may assume those SCells may fail together when a beam failure occurs. When the physical layer receives the scheduling request, the physical layer may send the scheduling request over any valid uplink control resources except the uplink control resources associated with the SCell(s) to be avoided (e.g., as indicated by the mapping schemes described above).

In some cases, both the SpCell (e.g., PCell, PSCell, etc.) and an SCell may fail (e.g., experience beam failure), which may impact how UE 115-*a* performs a beam failure recovery procedure and transmit beam indication 215 (e.g., for when the SCell fails as described above). For example, if the SpCell beam failure has already been triggered and a corresponding RACH based recovery (e.g., to reestablish communications with the SpCell) has been initiated when the beam failure recovery for the SCell is triggered, UE 115-*a* may wait for the SpCell beam failure recovery (e.g., via the RACH based recovery) to complete before sending the MAC CE carrying beam indication 215 for the SCell beam failure recovery. Accordingly, UE 115-*a* may transmit the MAC CE carrying beam indication 215 based on an uplink grant provided in a second RACH message (e.g., msg2) of the RACH for the SpCell beam failure recovery.

Additionally or alternatively, if a beam failure on the SCell occurs before a beam failure on the SpCell, UE 115-*a* may take different actions. For example, if UE 115-*a* has already triggered the scheduling request for the SCell beam failure recovery (e.g., to request uplink resources to transmit the MAC CE carrying beam indication 215) when the SpCell beam failure recovery is triggered, UE 115-*a* may perform the RACH based beam failure recovery for the SpCell first and then may send the MAC CE carrying beam indication 215 for the SCell beam failure recovery in the uplink grant provided in the second message (e.g., msg2) of the RACH for the SpCell beam failure recovery. Additionally or alternatively, if the MAC CE carrying beam indication 215 for the SCell beam failure recovery has already been sent when the SpCell beam failure recovery is triggered but base station 105-*a* has not reconfigured the downlink beam for the SCell, UE 115-*a* may perform the SpCell beam failure recovery (e.g., RACH based recovery) first before completing the beam failure recovery for the SCell.

In some cases, UE 115-*a* and/or base station 105-*a* may configure a timer and a counter for the SCell beam failure recovery with transmitting the MAC CE carrying beam indication 215 to reestablish the connection with the SCell via the indicated beam (e.g., selected first beam). Accordingly, if base station 105-*a* has not reconfigured a downlink beam for the failed SCell before the configured timer expires, UE 115-*a* may send the MAC CE carrying beam indication 215 again (e.g., on uplink resources requested by UE 115-*a* and/or uplink resources indicated by base station 105-*a* as described above). With each transmission/retransmission of the MAC CE carrying beam indication 215, UE 115-*a* may increase the counter by one (1) and may keep trying to send the MAC CE until a limit of the counter (e.g., counter threshold) is reached. If the limit of the counter is reached, UE 115-*a* may trigger a radio link failure. In some cases, the radio link failure may result in UE 115-*a* performing a RACH to identify a new SCell for establish a secondary communication link.

When using the MAC CE carrying beam indication 215 for a beam failure recovery procedure, UE 115-*a* may multiplex the MAC CE carrying beam indication 215 into a MAC PDU as described above (e.g., when the uplink resource is available). Additionally, the MAC CE carrying beam indication 215 may be give a high priority during a logical-channel prioritization (LCP) procedure when the MAC CE carrying beam indication 215 is multiplexed into a MAC PDU together with other data (e.g., to ensure prompt recovery of failed beams). The priority for the MAC CE carrying beam indication 215 may be lower than a common control channel (CCCH) message but higher than the rest of the MAC CEs and data of any additional logical channel.

In some implementations, the MAC CE carrying beam indication 215 may be used for additional purpose. For example, UE 115-*a* may indicate a preferred beam 205 (e.g., beam 205-*b*) during a RACH procedure. In some cases, UE 115-*a* may determine to perform a RACH procedure to establish an initial connection with base station 105-*a* or to reestablish communications with a cell of base station 105-*a* (e.g., PCell, PSCell, SPCell). Each physical RACH (PRACH) occasion may be associated with a reference signal (e.g., a candidate beam for UE 115-*a*). By selecting which PRACH occasion to send a PRACH preamble, UE 115-*a* may indicate to base station 105-*a* (e.g., implicitly) which beam is preferred for base station 105-a to use for performing the rest of the RACH procedure or for transmitting subsequent downlink signals. However, base station 105-*a* may configure up to 128 beams. Accordingly, in a case where many candidate beams 205 are configured, UE 115-*a* may wait a long time to reach the PRACH occasion of the 128 beams associated with the preferred beam (e.g., if the preferred beam is last in time, or otherwise later in time as the base station 105-*a* cycles through such beams for PRACH occasions).

To reduce the amount of time UE 115-*a* waits, UE 115-*a* may choose a suitable beam to send a PRACH preamble, where the suitable beam is available sooner than the preferred beam but may have a lower signal quality than the preferred beam. UE 115-*a* may then indicate the preferred beam in the MAC CE carrying beam indication 215, following the transmission of the PRACH preamble. In some cases, this MAC CE carrying beam indication 215 may be either included in a payload (e.g., physical uplink shared channel (PUSCH) payload) of MsgA in a two-step RACH or msg3 in a four-step RACH procedure.

Additionally or alternatively, to reduce access latency, UE 115-*a* may initiate a RACH procedure before measuring a link quality of all reference signals. Accordingly, once UE 115-*a* finds a beam with a suitable link quality for performing a RACH procedure, UE 115-*a* may start the RACH procedure. However, UE 115-*a* may continue measuring link qualities of the rest of the beams during RACH procedure. In some cases, if a better candidate beam is found during this continued measurement process, UE 115-*a* may indicate a latest preferred beam in MAC CE carrying beam indication 215. Similar to the techniques described above, the MAC CE carrying beam indication 215 may be included in a Msg3 in a four-step RACH procedure, a payload of a retransmitted MsgA in a two-step RACH, etc. When both using the suitable beam and/or continuing the link quality measurements, a multiplexing rule as described above may be applied to give the MAC CE carrying beam indication 215 a better chance of being included in msgA or msg3.

Figure 3:
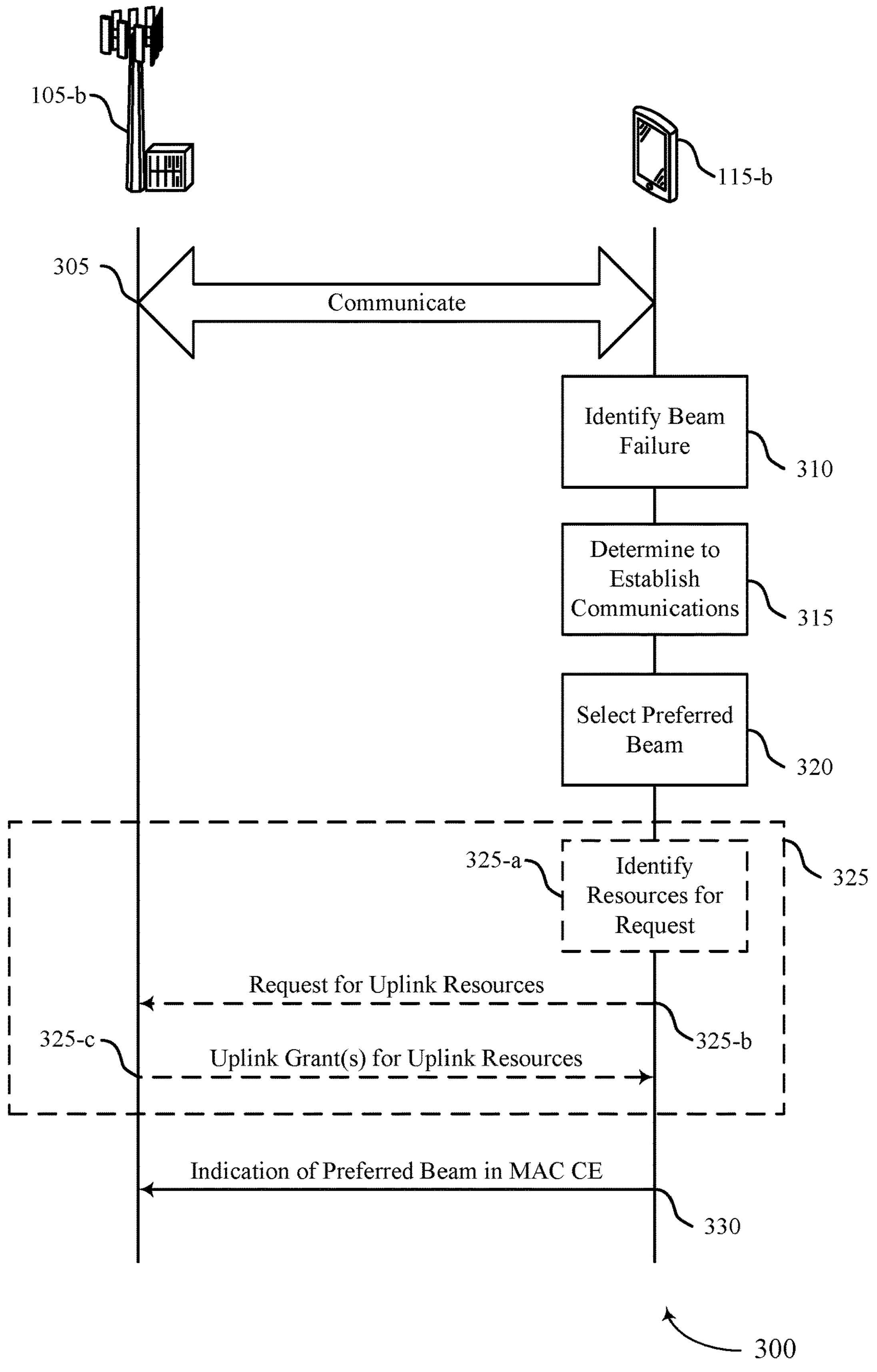
FIGS. 3, 4, and 5 illustrate examples of process flows that support MAC procedures for beam index indications in accordance with aspects of the present disclosure.

FIG. 3 illustrates an example of a process flow 300 that supports MAC procedures for beam index indications in accordance with aspects of the present disclosure. In some examples, process flow 300 may implement aspects of wireless communications systems 100 and/or 200. Process flow 300 may include a base station 105-*b* and a UE 115-*b*, which may be examples of a corresponding base station 105 and UE 115, respectively, as described above with reference to FIGS. 1-2. As described herein, base station 105-*b* and UE 115-*b* may use beamforming techniques to communicate with each other.

In the following description of the process flow 300, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 300, or other operations may be added to the process flow 300. It is to be understood that while base station 105-*b* and UE 115-*b* are shown performing a number of the operations of process flow 300, any wireless device may perform the operations shown.

At 305, UE 115-*b* may communicate with base station 105-*b* via a communication link. The communication link may include one or more beams of UE 115-*b* and one or more beams of base station 105-*b* associated with a serving cell.

At 310, UE 115-*b* may identify a beam failure for the communication link between UE 115-*b* and a serving cell of base station 105-*b* (e.g., SCell). For example, a parameter associated with the beam of communication link (e.g., RSRP, RSRQ, SINR, etc., for the connected beam as measure by UE 115-*b*) may fall below a threshold value.

At 315, UE 115-*b* may determine to establish the communication link (e.g., a new communication link, reestablish an old communication link, etc.) between UE 115-*b* and the serving cell based on the identified beam failure.

At 320, UE 115-*b* may select a first beam (e.g., preferred beam) of a set of candidate beams of the serving cell to establish the communication link. In some cases, UE 115-*b* may subsequently initiate a request (e.g., a scheduling request) for uplink resources for transmitting, to the base station, an indication of the selected first beam. Additionally, in some cases, the request may include a RACH message of a RACH procedure to establish the communication link between UE 115-*b* and the serving cell of base station 105-*b*.

At 325, UE 115-*b* may obtain an uplink resource for UE 115-*b* to transmit an indication of the first beam. In some cases, UE 115-*b* may compare a threshold number of slots to a number of slots between a current time and the uplink resource and determine the availability of the uplink resource based on the number of slots between the current time and the uplink resource being less than the threshold number of slots.

Additionally or alternatively, UE 115-*b* may transmit a request (e.g., scheduling request) based on the determined availability indicating that the number of slots between the current time and the uplink resource is greater than the threshold number of slots. Accordingly, UE 115-*b* may receive an indication of the uplink resources in response to the transmitted request and may transmit, on the indicated uplink resources, the indication of the selected first beam in the MAC CE. In some cases, UE 115-*b* may receive a configuration for beam failure recovery, the request for the uplink resources transmitted based on the received configuration, where the received configuration for beam failure recovery includes a UE-dedicated sequence of symbols. Additionally or alternatively, UE 115-*b* may transmit a scheduling request sequence indicating the request to base station 105-*b*, where the scheduling request sequence is transmitted on the uplink resources corresponding to a highest priority logical channel configured for the UE. In some cases, UE 115-*b* may perform a RACH procedure to request the uplink resources for transmitting the indication of the selected first beam.

When UE 115-*b* initiates the request for uplink resources that can be used for transmitting the indication of the selected at first beam as described above at 320, UE 115-*b* may perform subsequent actions based on initiating the request. For example, at 325-*a*, UE 115-*b* may first identify uplink control resources for transmitting the request. In some cases, the uplink control resources may include uplink control resources of a transmission occasion (e.g., TTI, slot, subframe, etc.) where UE 115-*b* can transmit the request. Additionally, UE 115-*b* may determine and select the uplink control resources for transmitting the request in such a way to indicate which serving cells and/or uplink resources UE 115-*b* wants for transmitting the indication of the selected first beam. For example, an index of the transmission occasion within a set of transmission occasions used for transmitting the request may indicate the serving cell on which the beam has failed. Additionally, the index may indicate to base station 105-*b* to not transmit a grant for uplink resources on that serving cell/beam). This transmission occasion to serving cell relationship may be considered a one-to-one mapping. Additionally or alternatively, an index of the transmission occasion within a set of transmission occasions used for transmitting the request may indicate a set of serving cells on which the beam has not failed and/or on which the requested uplink resources should be allocated. This transmission occasion to multiple serving cells relationship may be considered a multiple-to-one mapping.

At 325-*b*, UE 115-*b* may transmit the request on uplink control resources that indicate, to base station 105-*b*, a beam of the serving cell that has failed. In some cases, the request may include a configuration of uplink control resources that are associated with a beam failure recovery procedure, and UE 115-*b* may transmit the request on dedicated uplink control resources configured to indicate, to base station 105-*b*, a beam or a set of beams configured for the first serving cell that have failed. Additionally or alternatively, UE 115-*b* may transmit the request on uplink control resources of a transmission occasion as described above, where the uplink control resources indicate, to base station 105-*b*, that a beam of the serving cell has failed, and the transmission occasion of the uplink control resources associated with a set of serving cells may indicate the serving cell on which the beam has failed (e.g., based on the one-to-one mapping, multiple-to-one mapping, etc.).

At 325-*c*, UE 115-*b* may receive, from base station 105-*b* in response to the transmitted request, an indication of uplink resources in a second serving cell for UE 115-*b* to use to transmit the indication of the selected first beam. In some cases, UE 115-*b* may receive, from the second serving cell of base station 105-*b* in response to the transmitted request, DCI indicating uplink resources of the second serving cell for UE 115-*b* to use to transmit the indication of the selected first beam. For example, the second serving cell may include a PCell, a PSCell, or a SpCell (e.g., special serving cell) of UE 115-*b*. Additionally or alternatively, UE 115-*b* may receive, from base station in response to the transmitted request, an indication of uplink resources in the second serving cell different than the serving cell that has the beam failure for UE 115-*b* to use to transmit the indication of the selected first beam.

At 330, UE 115-*b* may transmit, to base station 105-*b*, the indication of the selected first beam in a MAC CE on an uplink resource based on a comparison of a timing of an availability of the uplink resource to a threshold value (e.g., the threshold number of slots). In some cases, UE 115-*b* may receive, from base station 105-*b*, a configuration indicating the threshold value (e.g., via RRC signaling). Additionally, UE 115-*b* may perform a logical channel prioritization procedure for a MAC PDU including the MAC CE, where the logical channel prioritization procedure provides a priority for the MAC CE greater than each other MAC CEs of the MAC PDU, greater than data of the MAC PDU, and less than information of a CCCH message of the MAC PDU. In some cases, UE 115-*b* may transmit, based on the determined availability indicating that the number of slots between the current time and the uplink resource is less than the threshold number of slots, the indication of the selected first beam in the MAC CE.

In some cases, UE 115-*b* may identify a beam failure for a second communication link between UE 115-*b* and a second serving cell, the second serving cell including a PCell, a PSCell, or an SpCell. Accordingly, UE 115-*b* may initiate a RACH procedure to reestablish the second communication link with the second serving cell, where the indication of the selected first beam is transmitted after the RACH procedure to reestablish the second communication link with the second serving cell is complete. In some cases, the beam failure for the second communication link may be identified before the second beam failure for the communication link. Alternatively, the beam failure for the second communication link may be identified after the second beam failure for the communication link. However, in both cases, as described above, UE 115-*b* may transmit the indication of the selected first beam after the RACH procedure to reestablish the second communication link with the second serving cell is complete.

Additionally, in some cases, UE 115-*b* may initiate a timer and a counter based on determining to establish the communication link. Subsequently, UE 115-*b* may increment the counter based on transmitting the indication of the selected first beam and may retransmit the indication of the selected first beam in the MAC CE based on the timer expiring before a message is received on the selected first beam (e.g., from base station 105-*b*) and the counter being below a counter threshold. Additionally, when the counter threshold is met or exceeded, UE 115-*b* may trigger a radio link failure based on the counter satisfying the counter threshold.

Figure 4:
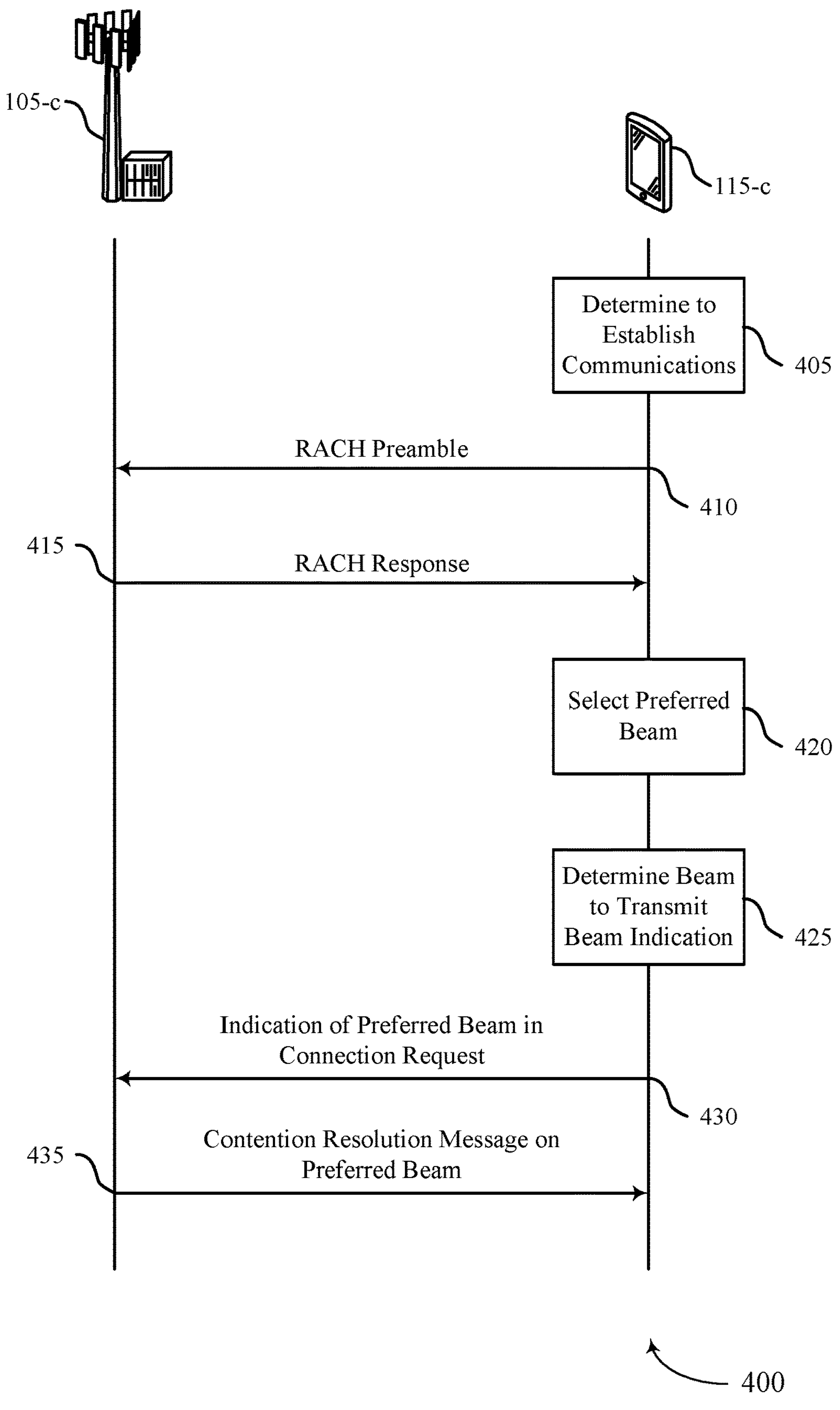

FIG. 4 illustrates an example of a process flow 400 that supports MAC procedures for beam index indications in accordance with aspects of the present disclosure. In some examples, process flow 400 may implement aspects of wireless communications systems 100 and/or 200. Process flow 400 may include a base station 105-*c* and a UE 115-*c*, which may be examples of a corresponding base station 105 and UE 115, respectively, as described above with reference to FIGS. 1-3. As described herein, base station 105-*c* and UE 115-*c* may use beamforming techniques to communicate with each other. Process flow 400 may include similar steps for selecting a beam and transmitting an indication of the selected beam as described above with reference to FIG. 3. However, UE 115-*c* may select the beam and indicate the selected beam for a RACH procedure (e.g., a four-step RACH procedure) rather than a beam failure recovery procedure.

In the following description of the process flow 400, the operations between UE 115-*c* and base station 105-*c* may be transmitted in a different order than the order shown, or the operations performed by base station 105-*c* and UE 115-*c* may be performed in different orders or at different times. Certain operations may also be left out of the process flow 400, or other operations may be added to the process flow 400. It is to be understood that while base station 105-*c* and UE 115-*c* are shown performing a number of the operations of process flow 400, any wireless device may perform the operations shown.

At 405, UE 115-*c* may determine to establish a communication link between UE 115-*c* and a serving cell of base station 105-*c*. For example, UE 115-*c* may have entered a geographic coverage area of base station 105-*c* and determines to establish an initial communication link with base station 105-*c* via a four-step RACH procedure. Additionally or alternatively, UE 115-*c* may experience a beam failure with the serving cell, and rather than performing a beam failure recovery, UE 115-*c* may perform the four-step RACH procedure to reestablish a communication link with the serving cell. In some cases, UE 115-*c* may perform the four-step RACH procedure rather than the beam failure recovery procedure based on the serving cell being a PCell, a PSCell, or a SPCell, where a beam failure with the PCell, PSCell, or SPCell results in a new communication link to be established.

At 410, UE 115-*c* may transmit a RACH preamble (e.g., first message) of the four-step RACH procedure. Subsequently, at 415, UE 115-*c* may receive a random access response (e.g., second message) of the four-step RACH procedure.

At 420, UE 115-*c* may select a first beam (e.g., preferred beam) of a set of candidate beams of the serving cell. In some cases, UE 115-*c* may select the first beam based on information received in the random access response. Additionally or alternatively, UE 115-*c* may receive the random access response from multiple beams transmitted by base station 105-*c* (e.g., via a beam sweeping operation, to improve reliability that the random access response is successfully received at UE 115-*c*, etc.) and may measure signal qualities of the multiple beams to select the first beam.

At 425, UE 115-*c* may determine a beam to transmit an indication of the selected first beam to base station 105-*c*. In some cases, UE 115-*c* may determine that a second beam of the set of candidate beams is available to transmit the indication of the selected first beam prior to the availability of an uplink resource by at least a threshold value, where the uplink resource includes the first beam. Additionally or alternatively, UE 115-*c* may measure a signal quality parameter of the set of candidate beams of the serving cell (e.g., RSRP, RSRQ, SINR, or other quality parameter for the beams), including the first beam and the second beam, and may determine, based on the measured signal quality parameter for the first beam and the second beam, that the second beam is preferred over the first beam.

At 430, UE 115-*c* may transmit, to base station 105-*c*, the indication of the selected first beam (e.g., preferred beam) in a MAC CE in a random access message of the four-step RACH procedure. For example, the indication of the selected first beam may be transmitted on the second beam in a connection request message (e.g., message 3) of the four-step RACH procedure.

At 435, UE 115-*c* may receive a contention resolution message (e.g., message 4) of the four-step RACH procedure from base station 105-*c*, which may complete the four-step RACH procedure. In some cases, base station 105-*c* may transmit the contention resolution message on the selected first beam that UE 115-*c* indicated in the connection request message.

Figure 5:
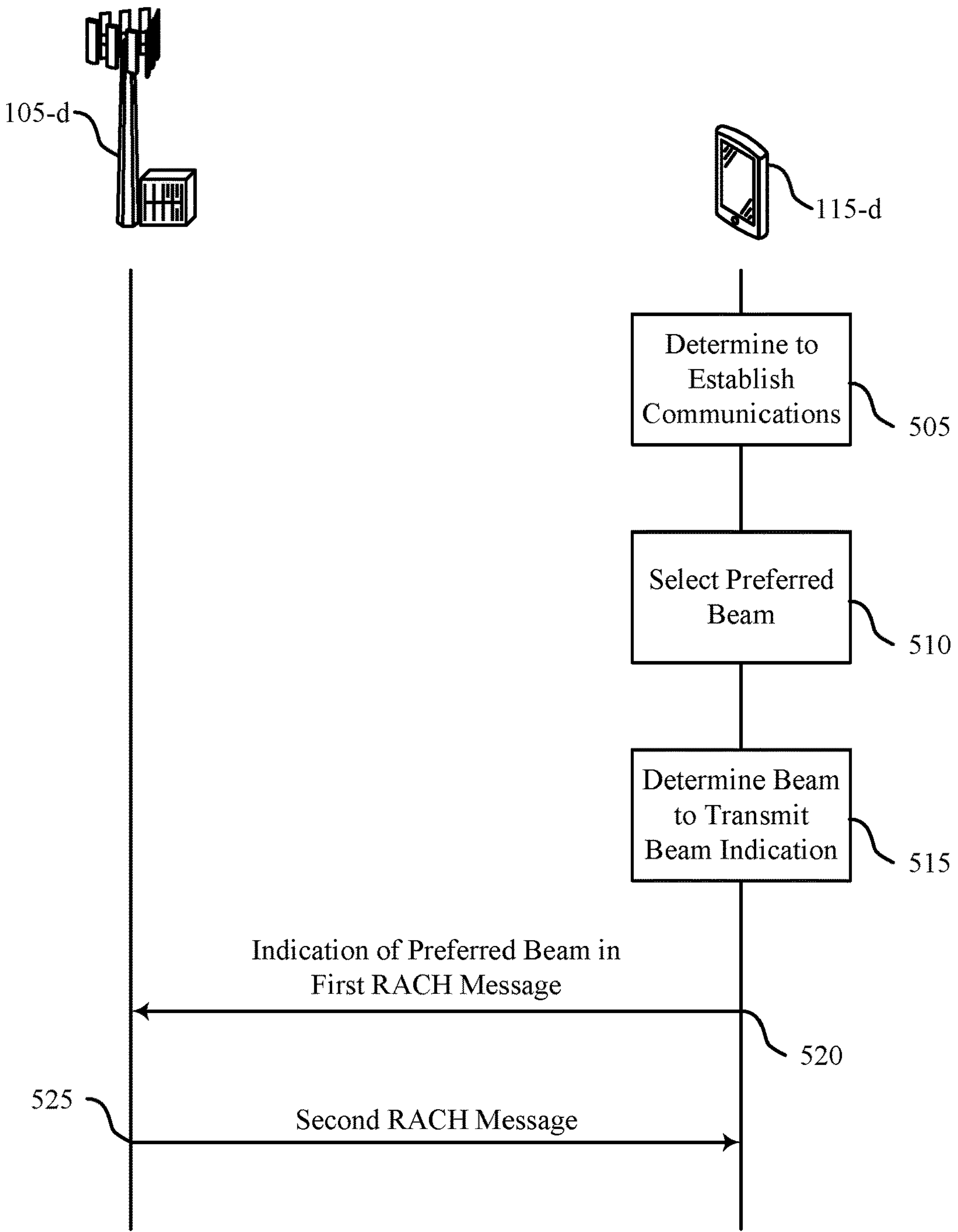

FIG. 5 illustrates an example of a process flow 500 that supports MAC procedures for beam index indications in accordance with aspects of the present disclosure. In some examples, process flow 500 may implement aspects of wireless communications systems 100 and/or 200. Process flow 500 may include a base station 105-*d* and a UE 115-*d*, which may be examples of a corresponding base station 105 and UE 115, respectively, as described above with reference to FIGS. 1-4. As described herein, base station 105-*d* and UE 115-*d* may use beamforming techniques to communicate with each other. Process flow 500 may include similar steps for selecting a beam and transmitting an indication of the selected beam as described above with reference to FIGS. 3 and 4. However, different from process flow 300 but similar to process flow 400, UE 115-*d* may select the beam and indicate the selected beam for a RACH procedure (e.g., a two-step RACH procedure) rather than a beam failure recovery procedure.

In the following description of the process flow 500, the operations between UE 115-*d* and base station 105-*d* may be transmitted in a different order than the order shown, or the operations performed by base station 105-*d* and UE 115-*d* may be performed in different orders or at different times. Certain operations may also be left out of the process flow 500, or other operations may be added to the process flow 500. It is to be understood that while base station 105-*d* and UE 115-*d* are shown performing a number of the operations of process flow 500, any wireless device may perform the operations shown At 505, similar to process flow 400, UE 115-*d* may determine to establish a communication link between UE 115-*d* and a serving cell of base station 105-*d*. However, rather than performing a four-step RACH procedure, UE 115-*d* may be configured and capable of performing a two-step RACH procedure.

Accordingly, at 510, UE 115-*d* may select a first beam from a set of candidate beams of the serving cell. In some cases, UE 115-*d* may base this selection on prior signal quality measurements of the candidate beams or on-going signal quality measurements of the candidate beams. The signal quality measurements may include one or more of RSRP, RSRQ, SINR, or other signal quality measurements for the candidate beams.

At 515, UE 115-*d* may determine a beam to transmit an indication of the selected first beam similar to the techniques as described above with reference to FIG. 4 (e.g., a second beam is available before an indicated uplink resource is available, based on signal quality parameter measurements, etc.). For example, UE 115-*d* may determine to use a second beam to transmit the indication of the selected first beam.

At 520, rather than transmitting the indication of the selected first beam in the connection request message of a four-step RACH procedure, UE 115-*d* may transmit the indication of the selected first beam on the second beam in a first message (e.g., MsgA) of a two-step RACH procedure.

At 525, UE 115-*d* may receive a second message (e.g., MsgB) of the two-step RACH procedure from base station 105-*d*. In some cases, base station 105-*d* may transmit the second message of the two-step RACH procedure using the selected first beam indicated by UE 115-*d* in the first message of the two-step RACH procedure.

Figure 6:
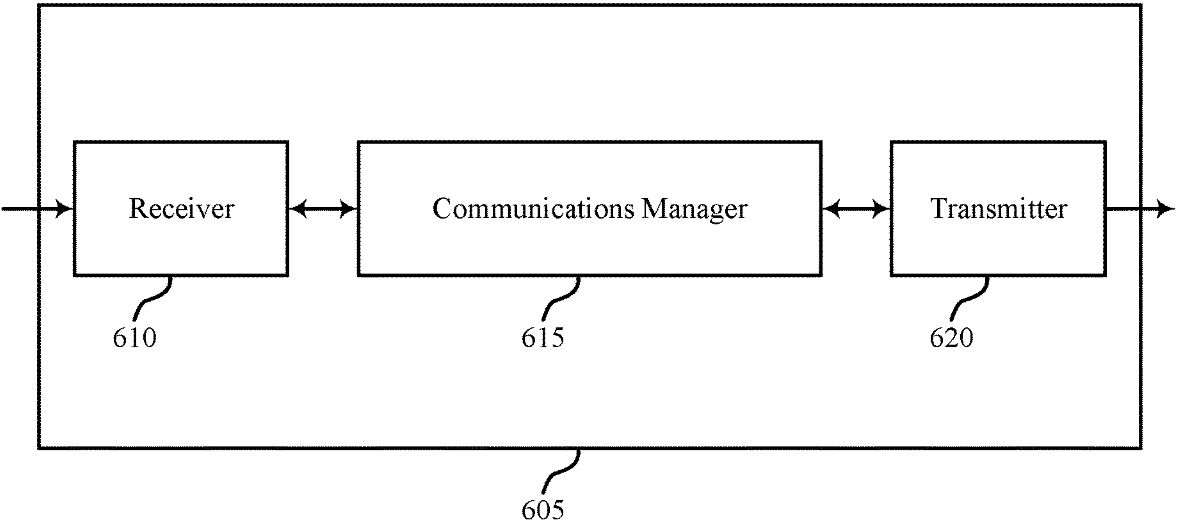
FIGS. 6 and 7 show block diagrams of devices that support MAC procedures for beam index indications in accordance with aspects of the present disclosure.
Figure 6:

FIG. 6 shows a block diagram 600 of a device 605 that supports MAC procedures for beam index indications in accordance with aspects of the present disclosure. The device 605 may be an example of aspects of a UE 115 as described herein. The device 605 may include a receiver 610, a communications manager 615, and a transmitter 620. The device 605 may also include one or more processors, memory coupled with the one or more processors, and instructions stored in the memory that are executable by the one or more processors to enable the one or more processors to perform the procedures for beam index indications discussed herein. Each of these components may be in communication with one another (e.g., via one or more buses).

The receiver 610 may receive information such as packets, user data, or control information associated with various information channels (e.g., control channels, data channels, and information related to MAC procedures for beam index indications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine to establish a communication link between the UE and a serving cell of a base station. In some cases, the communications manager 615 may select, by the UE to establish the communication link, a first beam of a set of candidate beams of the serving cell. Additionally, the communications manager 615 may transmit, to the base station, an indication of the selected first beam in a MAC control element on an uplink resource based on a comparison of a timing of an availability of the uplink resource to a threshold value. The communications manager 615 may be an example of aspects of the communications manager 910 described herein.

The communications manager 615 may be implemented as an integrated circuit or chipset for the device 605, and the receiver 610 and the transmitter 620 may be implemented as analog components (for example, amplifiers, filters, antennas) coupled with the device 605 to enable wireless transmission and reception. The actions performed by the communications manager 615 as described herein may be implemented to realize one or more potential advantages. At least one implementation may enable the communications manager 615 to establish a communication link with a base station using a preferred beam. Based on implementing the establishing, one or more processors of the device 605 (for example, processor(s) controlling or incorporated with the communications manager 615) may promote improvements to spectral efficiency, higher data rates and, in some examples, may promote enhanced efficiency for high reliability and low latency operations, among other benefits.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
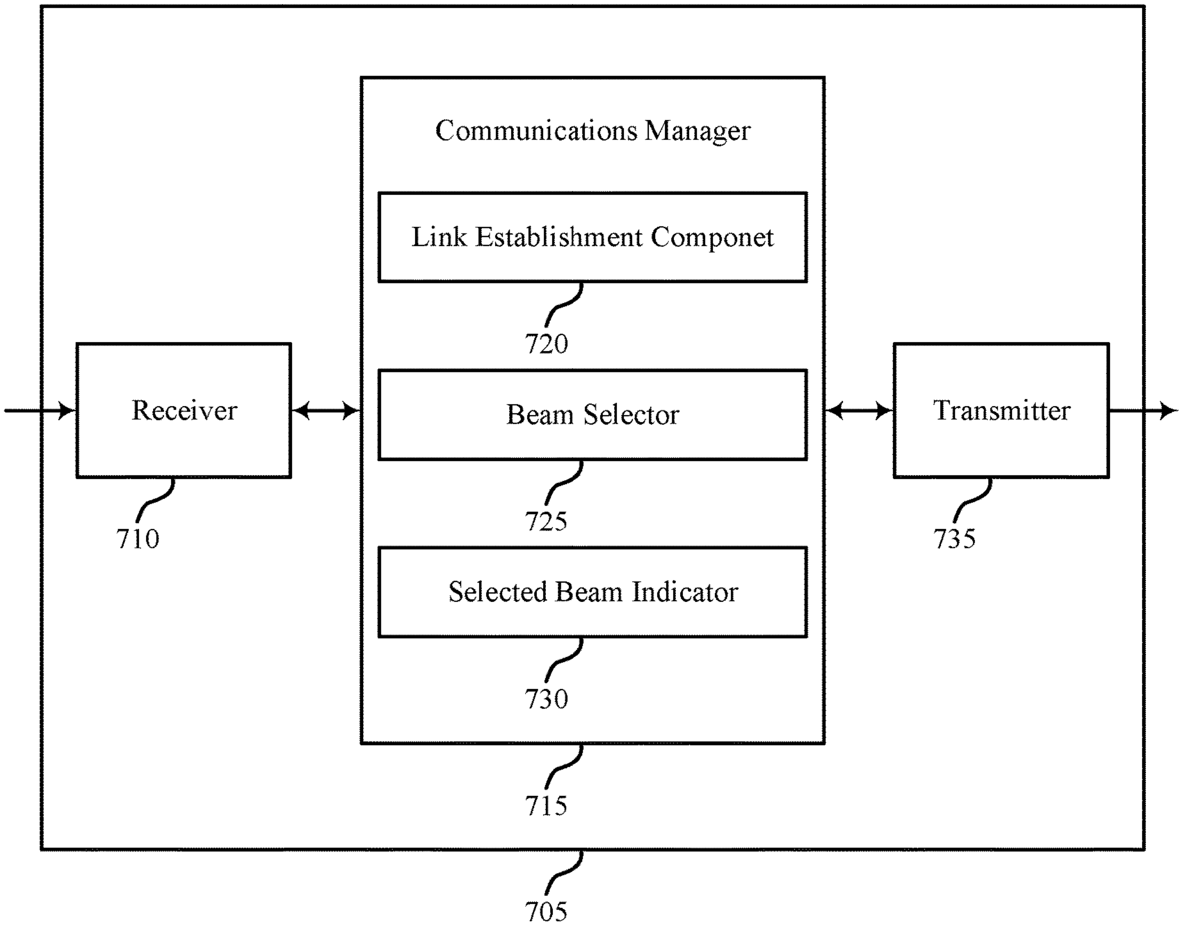
Figure 7:

FIG. 7 shows a block diagram 700 of a device 705 that supports MAC procedures for beam index indications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to MAC procedures for beam index indications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a link establishment component 720, a beam selector 725, and a selected beam indicator 730. The communications manager 715 may be an example of aspects of the communications manager 910 described herein.

The link establishment component 720 may determine to establish a communication link between the UE and a serving cell of a base station.

The beam selector 725 may select, by the UE to establish the communication link, a first beam of a set of candidate beams of the serving cell.

The selected beam indicator 730 may transmit, to the base station, an indication of the selected first beam in a MAC CE on an uplink resource based on a comparison of a timing of an availability of the uplink resource to a threshold value.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

In some cases, the link establishment component 720, beam selector 725, and selected beam indicator 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the link establishment component 720, beam selector 725, and selected beam indicator 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
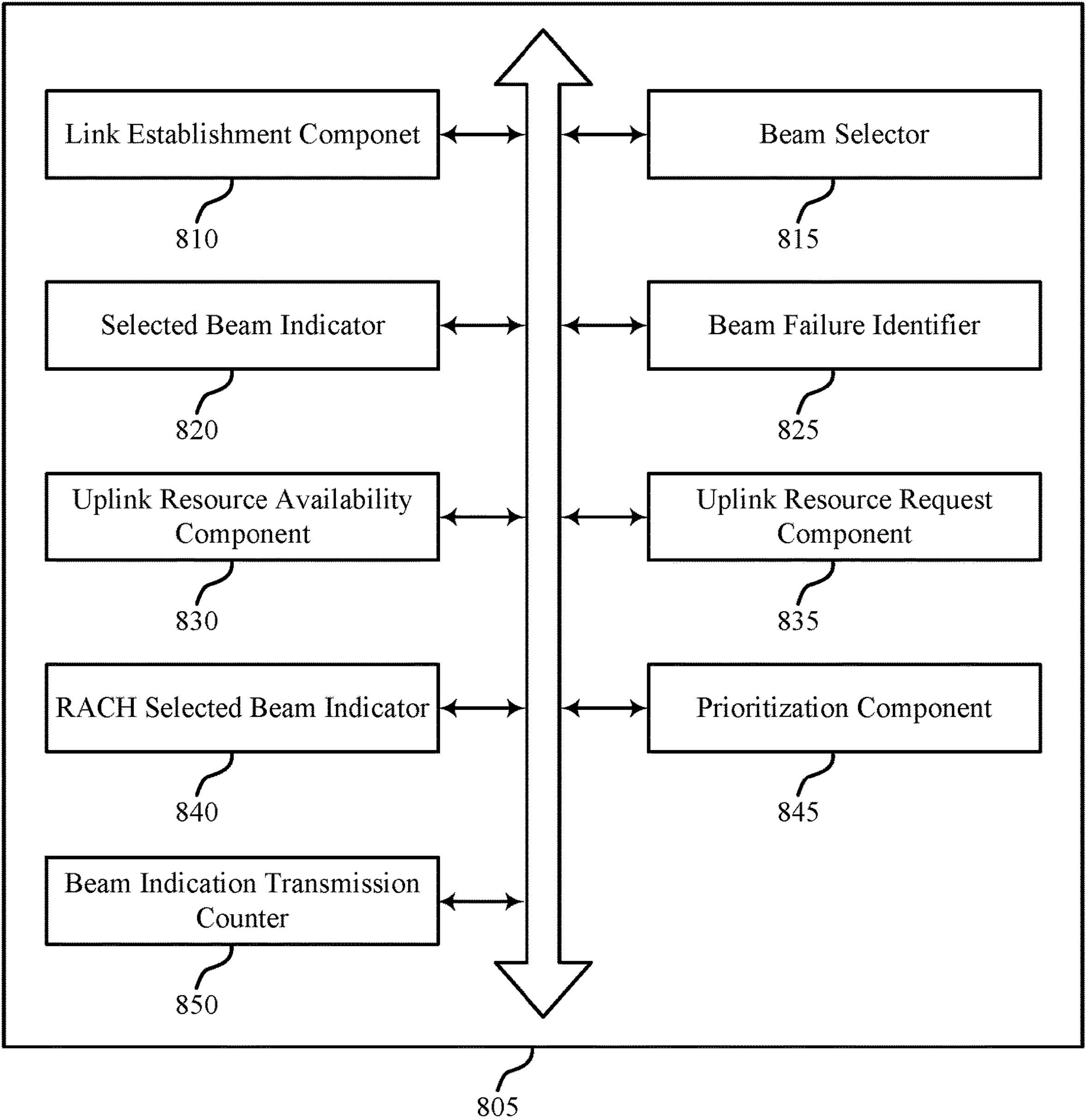
FIG. 8 shows a block diagram of a communications manager that supports MAC procedures for beam index indications in accordance with aspects of the present disclosure.

FIG. 8 shows a block diagram 800 of a communications manager 805 that supports MAC procedures for beam index indications in accordance with aspects of the present disclosure. The communications manager 805 may be an example of aspects of a communications manager 615, a communications manager 715, or a communications manager 910 described herein. The communications manager 805 may include a link establishment component 810, a beam selector 815, a selected beam indicator 820, a beam failure identifier 825, an uplink resource availability component 830, an uplink resource request component 835, a RACH selected beam indicator 840, a prioritization component 845, and a beam indication transmission counter 850. Each of these modules may communicate, directly or indirectly, with one another (e.g., via one or more buses).

The link establishment component 810 may determine to establish a communication link between the UE and a serving cell of a base station.

The beam selector 815 may select, by the UE to establish the communication link, a first beam of a set of candidate beams of the serving cell. In some cases, the beam selector 815 may initiate a request for uplink resources for transmitting, to the base station, the indication of the selected first beam. In some examples, the UE may transmit the request on uplink control resources that indicate, to the base station, a beam of the serving cell that has failed, and receive, from the base station in response to the transmitted request, an indication of uplink resources in a second serving cell for the UE to use to transmit the indication of the selected first beam.

The selected beam indicator 820 may transmit, to the base station, an indication of the selected first beam in a MAC CE on an uplink resource based on a comparison of a timing of an availability of the uplink resource to a threshold value. In some examples, the selected beam indicator 820 may receive, from the base station, a configuration indicating the threshold value.

The beam failure identifier 825 may communicate with the base station via the communication link and may identify a beam failure for the communication link between the UE the serving cell. Accordingly, the beam failure identifier 825 may determine to establish the communication link between the UE and the serving cell based on the identified beam failure.

The uplink resource availability component 830 may obtain the uplink resource for the UE to transmit an indication of the first beam, compare a threshold number of slots to a number of slots between a current time and the uplink resource, where the threshold value includes the threshold number of slots, and determine the availability of the uplink resource based on the number of slots between the current time and the uplink resource being less than the threshold number of slots. In some examples, the uplink resource availability component 830 may transmit, based on the determined availability indicating that the number of slots between the current time and the uplink resource is less than the threshold number of slots, the indication of the selected first beam in the MAC CE. Alternatively, the uplink resource availability component 830 may transmit a request for uplink resources to the base station based on the determined availability indicating that the number of slots between the current time and the uplink resource is greater than the threshold number of slots. Accordingly, the uplink resource availability component 830 may receive an indication of the uplink resources in response to the transmitted request and may transmit, on the indicated uplink resources, the indication of the selected first beam in the MAC CE.

The uplink resource request component 835 may receive a configuration for beam failure recovery, the request for the uplink resources transmitted based on the received configuration. In some cases, the received configuration for beam failure recovery may include a UE-dedicated sequence of symbols. Additionally or alternatively, the uplink resource request component 835 may transmit a scheduling request sequence indicating the request to the base station. In some cases, the scheduling request sequence may be transmitted on the uplink resources corresponding to a highest priority logical channel configured for the UE.

In some cases, uplink resource request component 835 may transmit the request on uplink control resources that indicate, to the base station, a beam of the serving cell that has failed and may receive, from the base station in response to the transmitted request, an indication of uplink resources in a second serving cell for the UE to use to transmit the indication of the selected first beam. Additionally or alternatively, the request may include a configuration of uplink control resources that are associated with beam failure recovery procedure, and uplink resource request component 835 may transmit the request on dedicated uplink control resources configured to indicate, to the base station, a beam or a set of beams configured for the first serving cell that have failed and, subsequently, may receive, from a second serving cell of the base station in response to the transmitted request, DCI indicating uplink resources of the second serving cell for the UE to use to transmit the indication of the selected first beam. In some cases, the second serving cell may include a PCell, a PSCell, or an SpCell of the UE.

Additionally or alternatively, uplink resource request component 835 may transmit the request on uplink control resources of a transmission occasion, the uplink control resources indicating, to the base station, that a beam of the serving cell has failed, and the transmission occasion of the uplink control resources associated with a set of serving cells to indicate the serving cell on which the beam has failed. In some cases, an index of the transmission occasion within a set of transmission occasions may indicate the serving cell on which the beam has failed. Alternatively, an index of the transmission occasion within a set of transmission occasions may indicate a set of serving cells on which the beam has not failed, a set of serving cells on which the requested uplink resources should be allocated, or a combination thereof The RACH selected beam indicator 840 may transmit, to the base station, the MAC control element in a RACH (e.g., random access) message of a RACH procedure. In some examples, the RACH selected beam indicator 840 may determine that a second beam of the set of candidate beams is available to transmit the indication of the first beam prior to the availability of the uplink resource by at least the threshold value, where the uplink resource includes the first beam, and the indication of the selected first beam is transmitted in a MAC CE on the second beam based on the determination that the second beam is available. Additionally or alternatively, the RACH selected beam indicator 840 may measure a signal quality parameter of the set of candidate beams of the serving cell, including the first beam and a second beam, may determine, based on the measured signal quality parameter for the first beam and the second beam, that the second beam is preferred over the first beam, and may transmit, based on determining that the second beam is preferred, an indication of the second beam in a signal of a RACH procedure. In some cases, the indication of the selected first beam may be transmitted on the second beam in a first message (e.g., MsgA) of a two-step RACH procedure. Additionally or alternatively, the indication of the selected first beam may be transmitted on the second beam in a connection request message (e.g., message 3) of a four-step RACH procedure.

In some cases, the RACH selected beam indicator 840 may identify a beam failure for a second communication link between the UE and a second serving cell, where the second serving cell may include a PCell, a PSCell, or an SpCell. Subsequently, the RACH selected beam indicator 840 may initiate a RACH procedure to reestablish the second communication link with the second serving cell, where the indication of the selected first beam is transmitted after the RACH procedure to reestablish the second communication link with the second serving cell is complete. In some cases, the beam failure for the second communication link may be identified before the second beam failure for the communication link. Alternatively, the beam failure for the second communication link may be identified after the second beam failure for the communication link.

The prioritization component 845 may perform a logical channel prioritization procedure for a MAC PDU including the MAC CE, where the logical channel prioritization procedure provides a priority for the MAC CE greater than each other MAC CE of the MAC PDU, greater than data of the MAC PDU, and less than information of a CCCH message of the MAC PDU.

The beam indication transmission counter 850 may initiate a timer and a counter based on determining to establish the communication link and may increment the counter based on transmitting the indication of the selected first beam. Additionally, the beam indication transmission counter 850 may retransmit the indication of the selected first beam in the MAC CE based on the timer expiring before a message is received on the selected first beam and the counter being below a counter threshold. In some cases, the beam indication transmission counter 850 may trigger a radio link failure based on the counter satisfying the counter threshold.

In some cases, the link establishment component 810, beam selector 815, selected beam indicator 820, beam failure identifier 825, uplink resource availability component 830, uplink resource request component 835, RACH selected beam indicator 840, prioritization component 845, and beam indication transmission counter 850 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the link establishment component 810, beam selector 815, selected beam indicator 820, beam failure identifier 825, uplink resource availability component 830, uplink resource request component 835, RACH selected beam indicator 840, prioritization component 845, and beam indication transmission counter 850 discussed herein.

Figure 9:
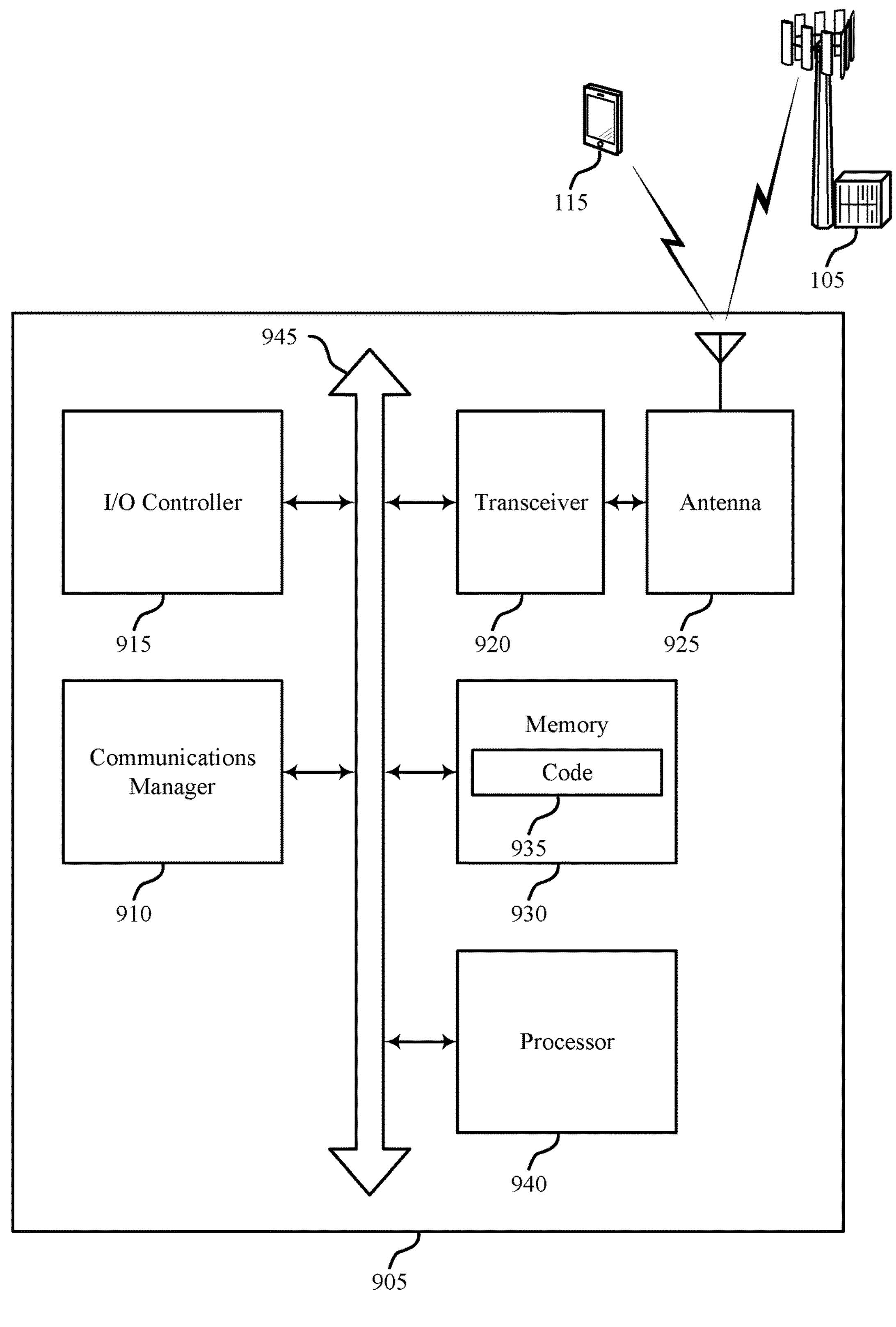
FIG. 9 shows a diagram of a system including a device that supports MAC procedures for beam index indications in accordance with aspects of the present disclosure.

FIG. 9 shows a diagram of a system 900 including a device 905 that supports MAC procedures for beam index indications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine to establish a communication link between the UE and a serving cell of a base station. In some cases, the communications manager 910 may select, by the UE to establish the communication link, a first beam of a set of candidate beams of the serving cell. Additionally, the communications manager 910 may transmit, to the base station, an indication of the selected first beam in a MAC CE on an uplink resource based on a comparison of a timing of an availability of the uplink resource to a threshold value. At least one implementation may enable the communications manager 910 to establish a communication link with a base station using a preferred beam. Based on implementing the establishing, one or more processors of the device 905 (for example, processor(s) controlling or incorporated with the communications manager 910) may promote improvements to spectral efficiency, higher data rates and, in some examples, may promote enhanced efficiency for high reliability and low latency operations, among other benefits.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting MAC procedures for beam index indications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
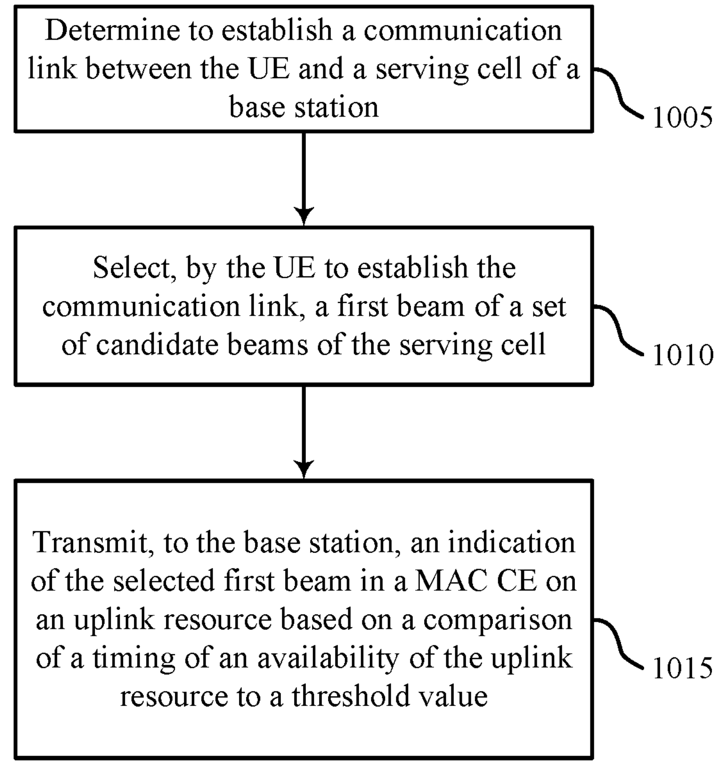
FIGS. 10 through 12 show flowcharts illustrating methods that support MAC procedures for beam index indications in accordance with aspects of the present disclosure.

FIG. 10 shows a flowchart illustrating a method 1000 that supports MAC procedures for beam index indications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may determine to establish a communication link between the UE and a serving cell of a base station. The operations of 1005 may be performed according to the methods described herein. In some examples, aspects of the operations of 1005 may be performed by a link establishment component as described with reference to FIGS. 6 through 9.

At 1010, the UE may select, by the UE to establish the communication link, a first beam of a set of candidate beams of the serving cell. The operations of 1010 may be performed according to the methods described herein. In some examples, aspects of the operations of 1010 may be performed by a beam selector as described with reference to FIGS. 6 through 9.

At 1015, the UE may transmit, to the base station, an indication of the selected first beam in a MAC CE on an uplink resource based on a comparison of a timing of an availability of the uplink resource to a threshold value. The operations of 1015 may be performed according to the methods described herein. In some examples, aspects of the operations of 1015 may be performed by a selected beam indicator as described with reference to FIGS. 6 through 9.

Figure 11:
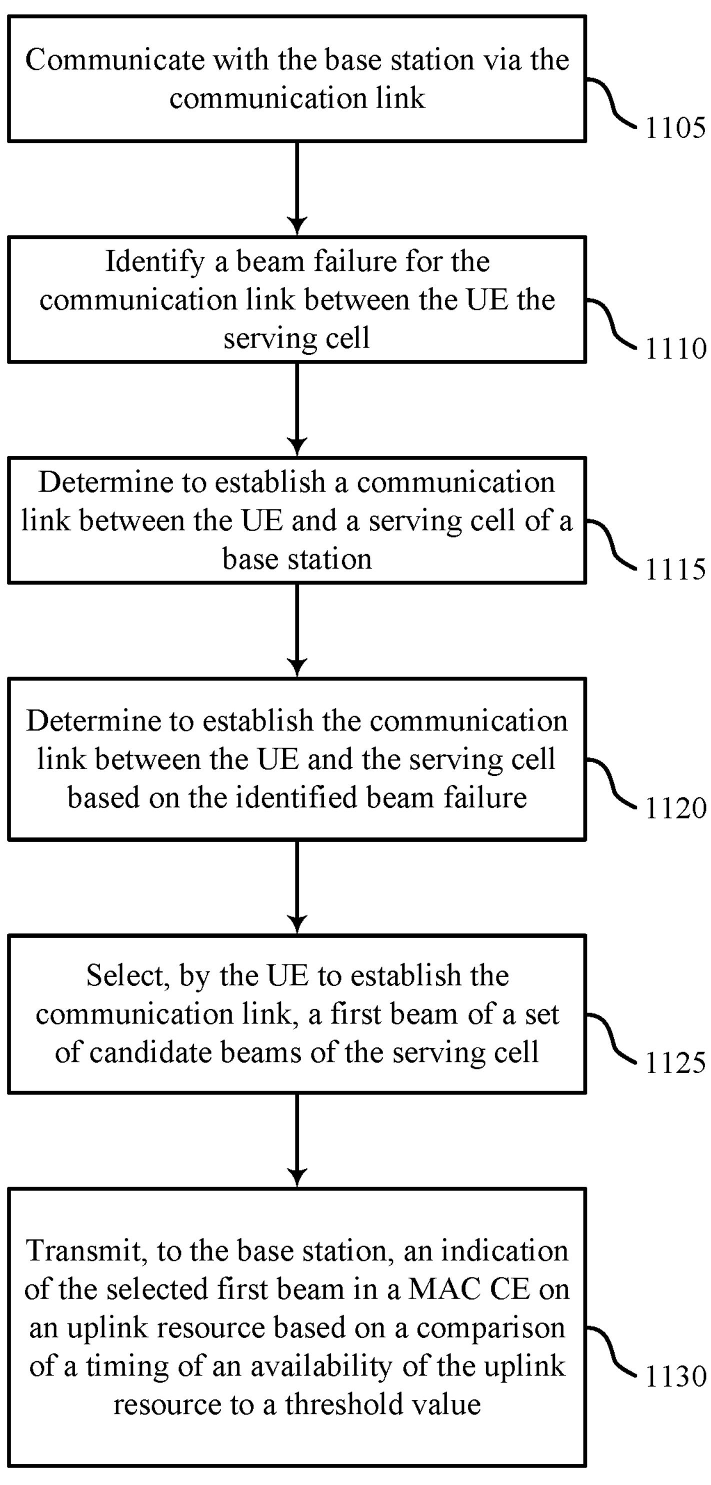

FIG. 11 shows a flowchart illustrating a method 1100 that supports MAC procedures for beam index indications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may communicate with the base station via the communication link. The operations of 1105 may be performed according to the methods described herein. In some examples, aspects of the operations of 1105 may be performed by a beam failure identifier as described with reference to FIGS. 6 through 9.

At 1110, the UE may identify a beam failure for the communication link between the UE the serving cell. The operations of 1110 may be performed according to the methods described herein. In some examples, aspects of the operations of 1110 may be performed by a beam failure identifier as described with reference to FIGS. 6 through 9.

At 1115, the UE may determine to establish a communication link between the UE and a serving cell of a base station. The operations of 1115 may be performed according to the methods described herein. In some examples, aspects of the operations of 1115 may be performed by a link establishment component as described with reference to FIGS. 6 through 9.

At 1120, the UE may determine to establish the communication link between the UE and the serving cell based on the identified beam failure. The operations of 1120 may be performed according to the methods described herein. In some examples, aspects of the operations of 1120 may be performed by a beam failure identifier as described with reference to FIGS. 6 through 9.

At 1125, the UE may select, by the UE to establish the communication link, a first beam of a set of candidate beams of the serving cell. The operations of 1125 may be performed according to the methods described herein. In some examples, aspects of the operations of 1125 may be performed by a beam selector as described with reference to FIGS. 6 through 9.

At 1130, the UE may transmit, to the base station, an indication of the selected first beam in a MAC CE on an uplink resource based on a comparison of a timing of an availability of the uplink resource to a threshold value. The operations of 1130 may be performed according to the methods described herein. In some examples, aspects of the operations of 1130 may be performed by a selected beam indicator as described with reference to FIGS. 6 through 9.

Figure 12:
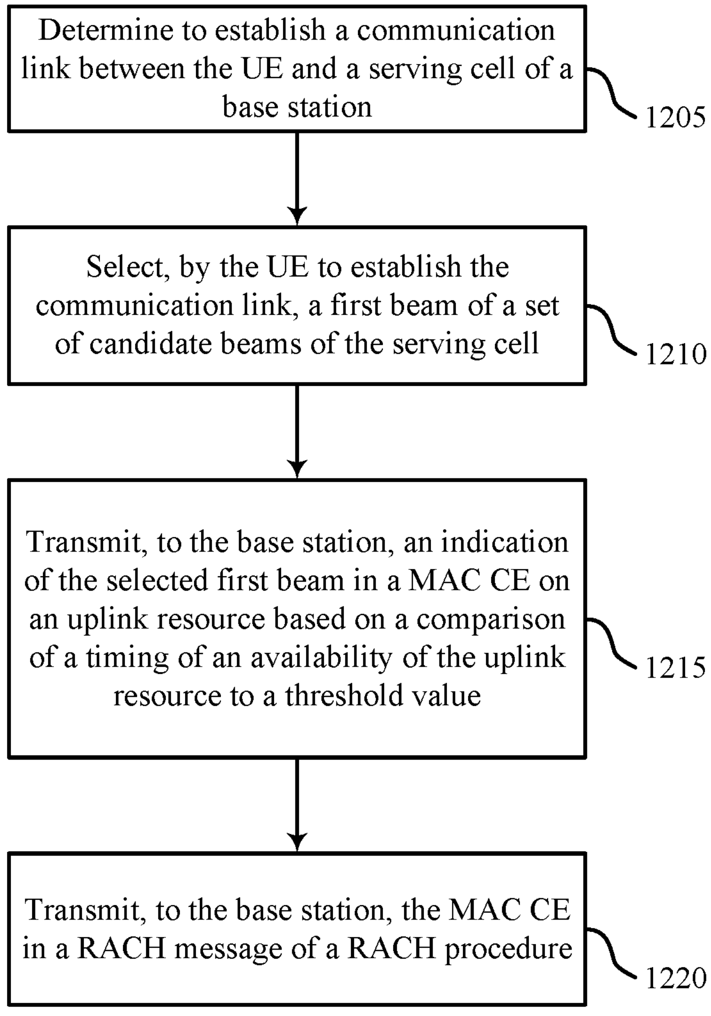

FIG. 12 shows a flowchart illustrating a method 1200 that supports MAC procedures for beam index indications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may determine to establish a communication link between the UE and a serving cell of a base station. The operations of 1205 may be performed according to the methods described herein. In some examples, aspects of the operations of 1205 may be performed by a link establishment component as described with reference to FIGS. 6 through 9.

At 1210, the UE may select, by the UE to establish the communication link, a first beam of a set of candidate beams of the serving cell. The operations of 1210 may be performed according to the methods described herein. In some examples, aspects of the operations of 1210 may be performed by a beam selector as described with reference to FIGS. 6 through 9.

At 1215, the UE may transmit, to the base station, an indication of the selected first beam in a MAC CE on an uplink resource based on a comparison of a timing of an availability of the uplink resource to a threshold value. The operations of 1215 may be performed according to the methods described herein. In some examples, aspects of the operations of 1215 may be performed by a selected beam indicator as described with reference to FIGS. 6 through 9.

At 1220, the UE may transmit, to the base station, the MAC CE in a RACH message of a RACH procedure. The operations of 1220 may be performed according to the methods described herein. In some examples, aspects of the operations of 1220 may be performed by a RACH selected beam indicator as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:

determining to establish a communication link between the UE and a serving cell of a base station, wherein the serving cell comprises a secondary cell;

selecting, by the UE to establish the communication link, a first beam of a plurality of candidate beams of the serving cell;

transmitting, by the UE in accordance with a beam failure recovery procedure for the secondary cell associated with the base station, a scheduling request for one or more first uplink resources that the UE is to use to transmit a beam index indication of the selected first beam to the base station based at least in part on an unavailability of one or more second uplink resources for transmission of the beam index indication, the unavailability based at least in part on a number of slots between a current time and the one or more second uplink resources being greater than a threshold number of slots;

receiving, in response to the scheduling request, an indication of the one or more first uplink resources for the UE to use to transmit the beam index indication; and transmitting, by the UE to the base station, the beam index indication of the selected first beam in an uplink media access control (MAC) control element on the one or more first uplink resources.

2. The method of claim 1, further comprising:

transmitting the scheduling request on uplink control resources that indicate, to the base station, a beam of the serving cell that has failed; and receiving, from the base station in response to the scheduling request, the indication of the one or more first uplink resources in a second serving cell for the UE to use to transmit the beam index indication of the selected first beam.

3. The method of claim 1, wherein the scheduling request comprises a configuration of uplink control resources that are associated with the beam failure recovery procedure, and wherein:

the scheduling request is transmitted on dedicated uplink control resources configured to indicate, to the base station, a beam or a plurality of beams configured for the serving cell that have failed, and the indication of the one or more first uplink resources is received from a second serving cell of the base station in response to the scheduling request and via a downlink control information indicating the one or more first uplink resources of the second serving cell for the UE to use to transmit the beam index indication of the selected first beam.

4. The method of claim 1, further comprising:

transmitting the scheduling request on uplink control resources of a transmission occasion, the uplink control resources indicating, to the base station, that a beam of the serving cell has failed, and the transmission occasion of the uplink control resources associated with a set of serving cells to indicate the serving cell on which the beam has failed; and receiving, from the base station in response to the scheduling request, the indication of the one or more first uplink resources in a second serving cell different than the serving cell for the UE to use to transmit the beam index indication of the selected first beam.

5. The method of claim 1, wherein the scheduling request comprises a random access message of a random access procedure to establish the communication link between the UE and the serving cell of the base station.

6. The method of claim 1, wherein determining to establish the communication link comprises:

communicating with the base station via the communication link;

identifying a beam failure for the communication link between the UE the serving cell; and determining to establish the communication link between the UE and the serving cell based at least in part on the identified beam failure.

7. The method of claim 1, further comprising:

receiving a configuration for beam failure recovery, the scheduling request for the one or more first uplink resources transmitted based at least in part on the received configuration.

8. The method of claim 1, wherein transmitting the scheduling request for the one or more first uplink resources to the base station comprises:

transmitting a scheduling request sequence indicating the scheduling request to the base station.

9. The method of claim 8, wherein the scheduling request sequence is transmitted on uplink resources corresponding to a highest priority logical channel configured for the UE.

10. The method of claim 1, wherein transmitting the beam index indication of the selected first beam comprises:

transmitting, to the base station, the uplink MAC control element in a random access message of a random access procedure.

11. The method of claim 1, further comprising:

performing a logical channel prioritization procedure for a MAC protocol data unit comprising the uplink MAC control element, wherein the logical channel prioritization procedure provides a priority for the uplink MAC control element greater than each other uplink MAC control element of the MAC protocol data unit, greater than data of the MAC protocol data unit, and less than information of a common control channel message of the MAC protocol data unit.

12. The method of claim 1, further comprising:

initiating a timer and a counter based at least in part on determining to establish the communication link;

incrementing the counter based at least in part on transmitting the beam index indication of the selected first beam; and retransmitting the beam index indication of the selected first beam in the uplink MAC control element based at least in part on the timer expiring before a message is received on the selected first beam and the counter being below a counter threshold.

13. The method of claim 1, wherein the beam index indication of the selected first beam is transmitted based at least in part on a comparison of a timing of an availability of the one or more first uplink resources to a threshold value.

14. A user equipment (UE) for wireless communications, comprising:

memory, and one or more processors coupled with the memory and configured to cause the UE to:

determine to establish a communication link between the UE and a serving cell of a base station, wherein the serving cell comprises a secondary cell;

select, by the UE to establish the communication link, a first beam of a plurality of candidate beams of the serving cell;

transmit, by the UE in accordance with a beam failure recovery procedure for the secondary cell associated with the base station, a scheduling request for one or more first uplink resources that the UE is to use to transmit a beam index indication of the selected first beam to the base station based at least in part on an unavailability of one or more second uplink resources for transmission of the beam index indication, the unavailability based at least in part on a number of slots between a current time and the one or more second uplink resources being greater than a threshold number of slots;

receive, in response to the scheduling request, an indication of the one or more first uplink resources for the UE to use to transmit the beam index indication; and transmit, by the UE to the base station, the beam index indication of the selected first beam in an uplink media access control (MAC) control element on the one or more first uplink resources.

15. The UE of claim 14, wherein the scheduling request comprises a configuration of uplink control resources that are associated with the beam failure recovery procedure, and wherein:

the scheduling request is transmitted on dedicated uplink control resources configured to indicate, to the base station, a beam or a plurality of beams configured for the serving cell that have failed, and the indication of the one or more first uplink resources is received from a second serving cell of the base station in response to the scheduling request and via a downlink control information indicating the one or more first uplink resources of the second serving cell for the UE to use to transmit the beam index indication of the selected first beam.

16. The UE of claim 14, wherein the one or more processors are configured to cause the UE to:

perform a logical channel prioritization procedure for a MAC protocol data unit comprising the uplink MAC control element, wherein the logical channel prioritization procedure provides a priority for the uplink MAC control element greater than each other uplink MAC control element of the MAC protocol data unit, greater than data of the MAC protocol data unit, and less than information of a common control channel message of the MAC protocol data unit.

17. The UE of claim 14, wherein the beam index indication of the selected first beam is transmitted based at least in part on a comparison of a timing of an availability of the one or more first uplink resources to a threshold value.

18. The UE of claim 14, wherein the one or more processors are configured to cause the UE to:

transmit the scheduling request on uplink control resources that indicate, to the base station, a beam of the serving cell that has failed; and receive, from the base station in response to the scheduling request, the indication of the one or more first uplink resources in a second serving cell for the UE to use to transmit the beam index indication of the selected first beam.

19. The UE of claim 14, wherein the one or more processors are configured to cause the UE to:

transmit the scheduling request on uplink control resources of a transmission occasion, the uplink control resources indicating, to the base station, that a beam of the serving cell has failed, and the transmission occasion of the uplink control resources associated with a set of serving cells to indicate the serving cell on which the beam has failed; and receive, from the base station in response to the scheduling request, the indication of the one or more first uplink resources in a second serving cell different than the serving cell for the UE to use to transmit the beam index indication of the selected first beam.

20. The UE of claim 14, wherein the scheduling request comprises a random access message of a random access procedure to establish the communication link between the UE and the serving cell of the base station.

21. The UE of claim 14, wherein, to determine to establish the communication link, the one or more processors are configured to cause the UE to:

communicate with the base station via the communication link;

identify a beam failure for the communication link between the UE the serving cell; and determine to establish the communication link between the UE and the serving cell based at least in part on the identified beam failure.

22. The UE of claim 14, wherein the one or more processors are configured to cause the UE to:

receive a configuration for beam failure recovery, the scheduling request for the one or more first uplink resources transmitted based at least in part on the received configuration.

23. The UE of claim 14, wherein, to transmit the scheduling request for the one or more first uplink resources to the base station, the one or more processors are configured to cause the UE to:

transmit a scheduling request sequence indicating the scheduling request to the base station.

24. The UE of claim 23, wherein the scheduling request sequence is transmitted on uplink resources corresponding to a highest priority logical channel configured for the UE.

25. The UE of claim 14, wherein, to transmit the beam index indication of the selected first beam, the one or more processors are configured to cause the UE to:

transmit, to the base station, the uplink MAC control element in a random access message of a random access procedure.

26. The UE of claim 14, wherein the one or more processors are configured to cause the UE to:

initiate a timer and a counter based at least in part on determining to establish the communication link;

increment the counter based at least in part on transmitting the beam index indication of the selected first beam; and retransmit the beam index indication of the selected first beam in the uplink MAC control element based at least in part on the timer expiring before a message is received on the selected first beam and the counter being below a counter threshold.

27. An apparatus for wireless communications at a user equipment (UE), comprising:

means for determining to establish a communication link between the UE and a serving cell of a base station, wherein the serving cell comprises a secondary cell;

means for selecting, by the UE to establish the communication link, a first beam of a plurality of candidate beams of the serving cell;

means for transmitting, by the UE in accordance with a beam failure recovery procedure for the secondary cell associated with the base station, a scheduling request for one or more first uplink resources that the UE is to use to transmit a beam index indication of the selected first beam to the base station based at least in part on an unavailability of one or more second uplink resources for transmission of the beam index indication, the unavailability based at least in part on a number of slots between a current time and the one or more second uplink resources being greater than a threshold number of slots;

means for receiving, in response to the scheduling request, an indication of the one or more first uplink resources for the UE to use to transmit the beam index indication; and means for transmitting, by the UE to the base station, the beam index indication of the selected first beam in an uplink media access control (MAC) control element on the one or more first uplink resources.

28. The apparatus of claim 27, wherein the scheduling request comprises a configuration of uplink control resources that are associated with the beam failure recovery procedure, and wherein:

the scheduling request is transmitted on dedicated uplink control resources configured to indicate, to the base station, a beam or a plurality of beams configured for the serving cell that have failed, and the indication of the one or more first uplink resources is received from a second serving cell of the base station in response to the scheduling request and via a downlink control information indicating the one or more first uplink resources of the second serving cell for the UE to use to transmit the beam index indication of the selected first beam.

29. A non-transitory computer-readable medium storing code for wireless communications at a user equipment (UE), the code comprising instructions executable by one or more processors to:

determine to establish a communication link between the UE and a serving cell of a base station, wherein the serving cell comprises a secondary cell;

select, by the UE to establish the communication link, a first beam of a plurality of candidate beams of the serving cell;

transmit, by the UE in accordance with a beam failure recovery procedure for the secondary cell associated with the base station, a scheduling request for one or more first uplink resources that the UE is to use to transmit a beam index indication of the selected first beam to the base station based at least in part on an unavailability of one or more second uplink resources for transmission of the beam index indication, the unavailability based at least in part on a number of slots between a current time and the one or more second uplink resources being greater than a threshold number of slots;

receive, in response to the scheduling request, an indication of the one or more first uplink resources for the UE to use to transmit the beam index indication; and transmit, by the UE to the base station, the beam index indication of the selected first beam in an uplink media access control (MAC) control element on the one or more first uplink resources.

30. The non-transitory computer-readable medium of claim 29, wherein the scheduling request comprises a configuration of uplink control resources that are associated with the beam failure recovery procedure, and wherein:

the scheduling request is transmitted on dedicated uplink control resources configured to indicate, to the base station, a beam or a plurality of beams configured for the serving cell that have failed, and the indication of the one or more first uplink resources is received from a second serving cell of the base station in response to the scheduling request and via a downlink control information indicating the one or more first uplink resources of the second serving cell for the UE to use to transmit the beam index indication of the selected first beam.

* * * * *